United States Patent
Arai et al.

[11] Patent Number: 5,946,018
[45] Date of Patent: Aug. 31, 1999

[54] IMAGE FORMATION APPARATUS AND METHOD FOR CLEAR CHARACTER AND SMOOTH IMAGE REPRODUCTION

[75] Inventors: Kazuhiko Arai; Yasuhiro Oda; Masahiko Kubo; Nobuyuki Kato; Taketoshi Hoshizaki, all of Kanagawa, Japan

[73] Assignee: Fuji Xerox Co., Ltd., Tokyo, Japan

[21] Appl. No.: 08/767,367

[22] Filed: Dec. 16, 1996

[30] Foreign Application Priority Data

Dec. 18, 1995 [JP] Japan ................................ 7-329160

[51] Int. Cl.⁶ .......................... B41J 2/385; G03G 13/04; G03G 15/01; G01D 15/06
[52] U.S. Cl. ............................................. 347/115
[58] Field of Search ............................ 399/46, 48, 168; 347/132, 135, 140, 115, 119; 358/300; 430/31; 250/235

[56] References Cited

FOREIGN PATENT DOCUMENTS

A-1-169454  7/1989  Japan .
A-2-282277  11/1990  Japan .

*Primary Examiner*—N. Le
*Assistant Examiner*—L. Anderson
*Attorney, Agent, or Firm*—Oliff & Berridge, PLC

[57] ABSTRACT

A photosensitive body, charge device, and exposure device are adjusted so as to satisfy relations $$0.3 < E2/E1 < 1.3$$

and $$0.2 < E1/E0 < 0.6$$

wherein a charge potential of the photosensitive body charged by the charge device is VH, a saturated surface potential of light attenuation of the photosensitive body is VL, an energy setup value of a light beam is E0, a light energy width of a dead area in which the surface potential of the photosensitive body remains in a potential less than or equal to VH and greater than or equal to VH−(VH−VL)/5 is E1, and a light energy width of a responsive area in which the surface potential of the photosensitive body remains in a potential less than or equal to VH−(VH−VL)/5 and greater than or equal to VL+(VH−VL)/5 is E2.

10 Claims, 14 Drawing Sheets

SOS SIGNAL

BEAM DIAMETER: MAIN SCANNING: 32μm
SUB SCANNING: 64μm
NUMBER OF SCREEN LINES: 400 LINES PER 10,000 LINES

- 114: CHARGE TRANSPORTING LAYER
- 113: PHOTOELECTRIC POTENTIAL DETERIORATE CONTROL LAYER
- 112: CHARGE GENERATING LAYER
- 111: CONDUCTIVE SUPPORTING BODY

- 116: PHOTOSENSITIVE LAYER
- 115: MEDIUM LAYER
- 111: CONDUCTIVE SUPPORTING BODY

- 114: CHARGE TRANSPORTING LAYER
- 112: CHARGE GENERATION LAYER
- 115: MEDIUM LAYER
- 111: CONDUCTIVE SUPPORTING BODY

IMAGE FORMATION APPARATUS AND METHOD FOR CLEAR CHARACTER AND SMOOTH IMAGE REPRODUCTION

BACKGROUND OF THE INVENTION

This invention relates to an image formation apparatus of a so-called digital electrophotographic apparatus for uniformly charging a photosensitive body on which an electrostatic latent image is formed, irradiating the charged photosensitive body with a light beam modulated in response to image information, thereby forming an electrostatic latent image on the photosensitive body, and developing the electrostatic latent image to form a visible image.

In recent years, the image formation apparatus of a so-called digital electrophotographic apparatus for irradiating a photosensitive body with a light beam supporting image information representing characters, pictures, etc., thereby forming an electrostatic latent image on the photosensitive body as described above has been widely adopted for printers and copiers.

In such a digital image formation apparatus, hitherto an apparatus for turning on/off a light beam at high speed to form not only a monochrome binary image, but also a gray-scale image and forming an electrostatic latent image of a so-called halftone dot structure or full line structure, thereby representing halftone has been known. This apparatus, which uses a comparatively easy algorithm and can be realized at low cost, has been widely adopted for printers and copiers of the digital electrophotographic apparatus.

In such an apparatus for forming an electrostatic latent image of a so-called halftone dot structure or full line structure, thereby representing halftone, a latent image is formed in a constant light beam spot diameter and a constant number of dots or lines per unit length from the low-density portion (highlight portion) to the high-density portion in an image. Thus, the exposure profile in the highlight portion becomes an exposure profile having an intermediate (analog) exposure energy distribution lowering in contrast wherein exposure energy does not change binarily (digitally) as on/off, and further the exposure amount itself is also small. Thus, an image poor in reproducibility of dots and full lines and low in granularity is provided; stability of gradation representation against temperature and humidity environments is also poor. To reproduce small characters, particularly, small kanji characters, line reproducibility is also poor and crush and thin spots occur.

To overcome the problem, if the number of dots or lines per unit length is decreased for forming a latent image in order to improve the exposure profile contrast in the highlight portion, the reproducibility of dots and full lines in the highlight portion can be enhanced, but the image structure of dots, etc., becomes easy to recognize and resolution of characters also lowers, leading to low image quality.

An apparatus for making the light beam spot diameter sufficiently small is also possible, in which case an image formation optical channel for collecting a light beam for forming a light beam spot on a photosensitive body becomes too precise and expensive and is too upsized to be practical.

On the other hand, to overcome the problem, disclosed in the Unexamined Japanese Patent Application Publication No. Hei. 1-169454 is means for enhancing exposure profile contrast by using a photosensitive body having a light potential attenuation characteristic in which the charge potential is not attenuated until a reasonable exposure energy strength, and is attenuated abruptly when the exposure energy strength exceeds one threshold value. Also, the Japanese Patent Application Publication No. Hei. 2-282277 describes halftone image reproduction using a photosensitive body indicating a similar characteristic to that in the Unexamined Japanese Patent Application Publication No. Hei. 1-169454.

According to the method, the charge potential is not attenuated at a weak exposure energy strength, thus the weak exposure energy portion on the base of exposure profile is cut off and clear characters can be reproduced. Also, reproducibility of dots and full lines is made good and a rough image low in granularity is improved; an image excellent in granularity can be provided.

However, at the weak exposure energy strength, the charge potential changes abruptly when a dead area in which the charge potential is not attenuated is exceeded. Thus, gradation representation containing a highlight portion becomes steep and if an unevenness of light beam irradiation energy, etc., exists, easily becomes manifest as a density unevenness. To suppress the steep gradation representation and manifesting the density unevenness, it is still necessary to make the light beam spot diameter sufficiently small. As described above, the image formation optical channel becomes too precise and expensive and is too upsized to be practical.

SUMMARY OF THE INVENTION

It is therefore an object of the invention to provide an image formation apparatus and an image formation method which can provide clear character reproduction and smooth image reproduction excellent in granularity with clear dots and full lines and represent a highlight portion smoothly, uniformly, and stably although a practical light beam spot diameter is set.

To the ends, according to one aspect of the invention, there is provided an image formation apparatus comprising a photosensitive body, on which an electrostatic latent image is formed, moving in a predetermined sub scanning direction, means for charging the photosensitive body, exposure means for irradiating a plurality of pixels arranged in a predetermined main scanning direction crossing the sub scanning direction on the charged photosensitive body at the same time or in sequence with a light beam modulated in response to image information, thereby forming an electrostatic latent image on the photosensitive body, and developing means having a developer support for supporting a developer on a surface and transporting the developer to a developing position opposed to the photosensitive body for developing the electrostatic latent image formed on the photosensitive body, thereby forming a visible image on the photosensitive body, characterized in that the photosensitive body, the charge means, and the exposure means are adjusted so as to satisfy relations $$0.3 < E2/E1 < 1.3$$

and $$0.2 < E1/E0 < 0.6$$

wherein a charge potential of the photosensitive body charged by the charge means is VH, a saturated surface potential of light attenuation of the photosensitive body is VL, an energy setup value of the light beam is E0, a light energy width of a dead area in which the surface potential of the photosensitive body remains in a potential less than or equal to VH and greater than or equal to VH−(VH−VL)/5 is E1, and a light energy width of a responsive area in which the surface potential of the photosensitive body remains in a potential less than or equal to VH−(VH−VL)/5 and greater than or equal to VL+(VH−VL)/5 is E2.

According to another aspect of the invention, there is provided an image formation method comprising the steps of charging a photosensitive body, on which an electrostatic latent image is formed, moving in a predetermined sub scanning direction, irradiating a plurality of pixels arranged in a predetermined main scanning direction crossing the sub scanning direction on the charged photosensitive body at the same time or in sequence with a light beam modulated in response to image information, thereby forming an electrostatic latent image on the photosensitive body, and developing the electrostatic latent image formed on the photosensitive body, thereby forming a visible image on the photosensitive body, characterized in that the charging step and the exposing step are adjusted so as to satisfy relations $$0.3<E2/E1<1.3$$

and $$0.2<E1/E0<0.6$$

wherein a charge potential of the photosensitive body charged in the charging step is VH, a saturated surface potential of light attenuation of the photosensitive body is VL, an energy setup value of the light beam is E0, a light energy width of a dead area in which the surface potential of the photosensitive body remains in a potential less than or equal to VH and greater than or equal to VH−(VH−VL)/5 is E1, and a light energy width of a responsive area in which the surface potential of the photosensitive body remains in a potential less than or equal to VH−(VH−VL)/5 and greater than or equal to VL+(VH−VL)/5 is E2.

DETAILED DESCRIPTION OF THE PREFERRED EMBODIMENTS

Figure 1:
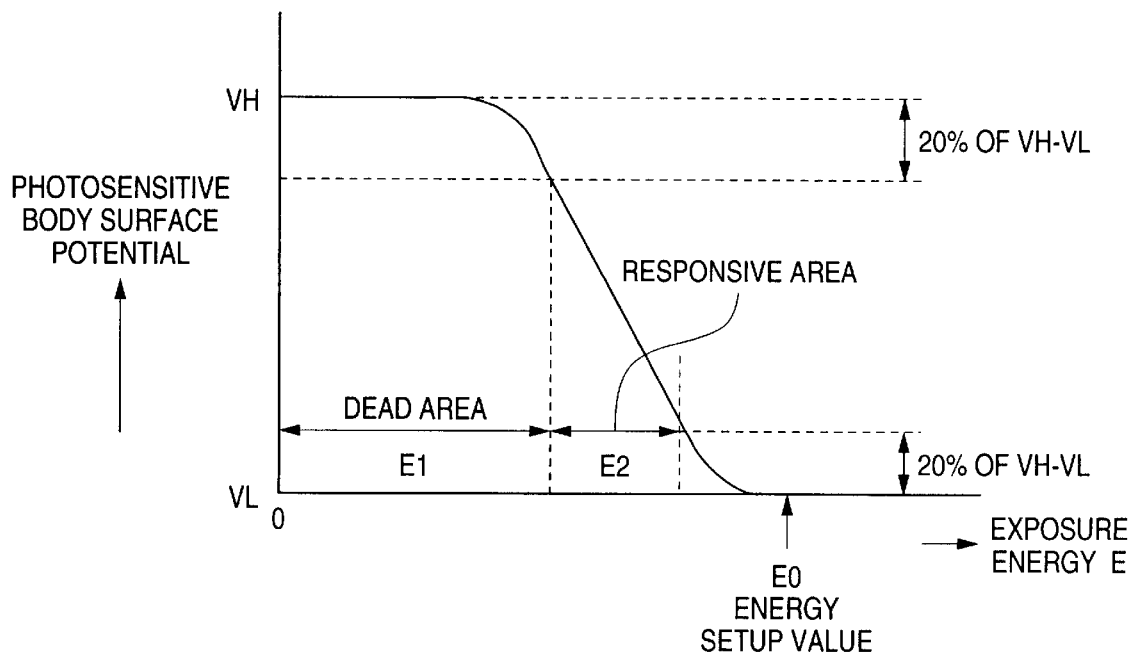
FIG. 1 a chart to show a light potential attenuation characteristic of a photosensitive body used with an image formation apparatus of the invention.

FIG. 1 is a chart to show a light potential attenuation characteristic of a photosensitive body used with an image formation apparatus of the invention.

It shows the light potential attenuation characteristic with exposure energy for the photosensitive body shown on the main axis and photosensitive body surface potential on the sub axis, wherein VH denotes the charge potential of the photosensitive body, VL denotes the saturated surface potential of light attenuation of the photosensitive body, namely, the potential at which after the photosensitive body surface potential is sufficiently attenuated by exposure, the ratio of potential attenuation to the light energy becomes 0.5 V·m$^2$/mJ, and light beam energy setup value E0 denotes energy of a light beam output when a 100% image signal is exposed to light.

As exposure energy is increased from 0, the photosensitive body surface potential holds an almost constant value at the beginning. When one exposure energy is reached, the photosensitive body surface potential starts to be attenuated. The area in which the attenuation amount of the photosensitive body surface potential remains 20% of VH−VL or less is referred to as a dead area and the light energy width of the dead area is denoted by E1. The area from the point at which as the exposure energy is furthermore increased, the attenuation amount of the photosensitive body surface potential exceeds 20% of VH−VL to the point at which the photosensitive body surface potential is attenuated to the level of 20% of VH−VL or less is referred to as a responsive area, and the light energy width of the responsive area is denoted by E2.

As shown in FIG. 1, in the image formation apparatus of the invention, the light potential attenuation characteristic of the photosensitive body is selected so that the ratio of the light energy width in the responsive area E2 to the light energy width in the dead area E1, E2/E1, becomes greater than 0.3 and less than 1.3 and that the ratio of the light energy width in the dead area E1 to the light beam energy setup value E0, E1/E0, becomes greater than 0.2 and less than 0.6, the charge potential of charge means is determined, and light energy of exposure means is adjusted. The ratio of the light energy width in the responsive area E2 to the light energy width in the dead area E1, E2/E1, is set greater than 0.3 and less than 1.3, whereby even if the dead area is exceeded and the responsive area is entered, the charge potential does not abruptly become zero. Thus, the instability of gradation representation for steep gradation representation, a light irradiation unevenness, etc., containing a highlight portion is suppressed. In addition, the ratio of the light energy width in the dead area E1 to the light beam energy setup value E0, E1/E0, is set greater than 0.2 and less than 0.6, whereby even if optical light beam spots are used, the weak exposure energy strength portion is cut off through the dead area. Thus, clear characters and good dots and full lines can be reproduced.

FIG. 2 is graphs to show the relationships among E2/E1 of the photosensitive body used with the image formation apparatus of the invention, gradation stability, and line and character reproducibility.

Figure 2C:
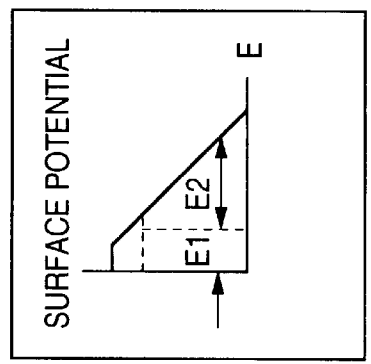
FIGS. 2(A)–(C) is graphs to show the relationships among E2/E1 of the photosensitive body used with the image formation apparatus of the invention, gradation stability, and line and character reproducibility.
Figure 2A:
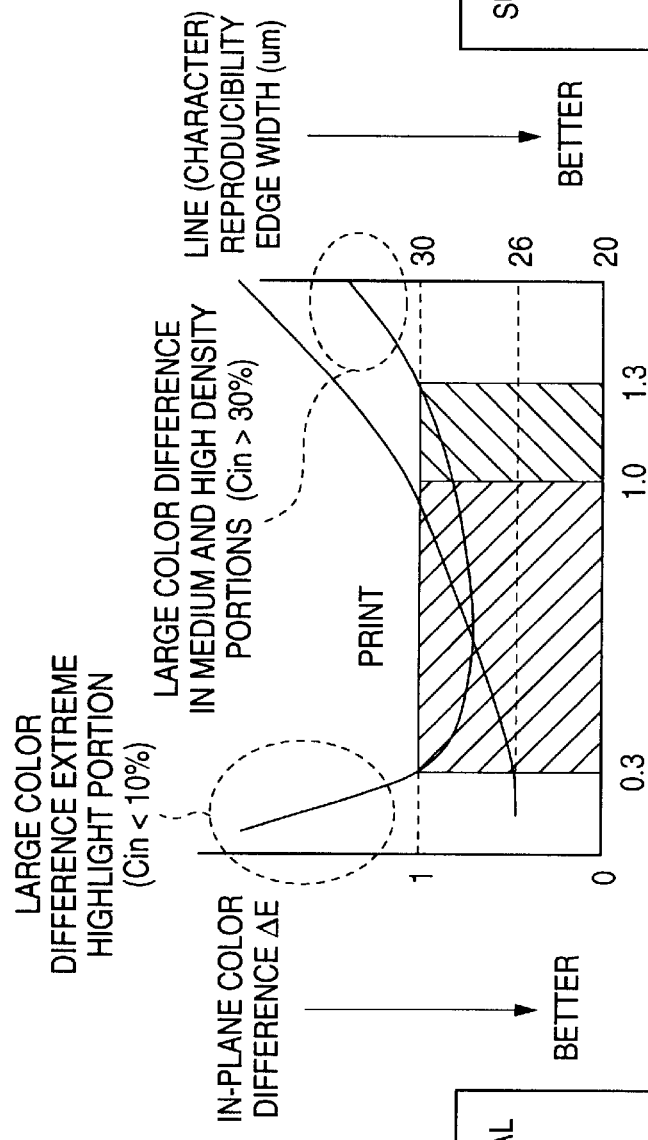

That is, the light energy width in the responsive area E2 to the light energy width in the dead area E1, E2/E1, is used to enter the main axis of the graph in FIG. 2A, in-plane color difference $\Delta E$ as an index representing gradation stability (color uniformity) is used to enter the left sub axis, and edge width (in $\mu m$ units) as an index representing line and character reproducibility is used to enter the right sub axis. At this time, the exposure condition is 200 lines/25 $\mu m$.

Measurement methods of the in-plane color difference $\Delta E$ and edge width will be discussed.

Figure 3:
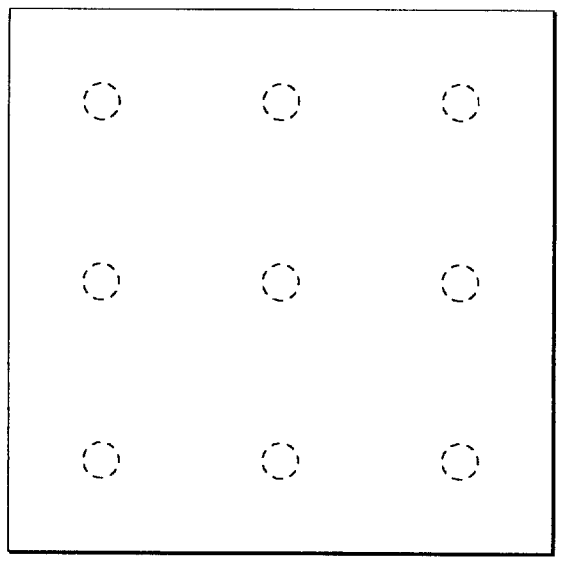
FIG. 3 is an illustration of in-plane color difference ΔE.

FIG. 3 is an illustration of the in-plane color difference $\Delta E$.

Using the image formation apparatus to be measured, three uniform halftone images of 15-cm square size having image area percentages Cin 10%, 20%, and 30% respectively are output onto recording paper, 9-point hues as shown in FIG. 3 (CIE Lab space) are measured for each image area percentage, and the vector length of the two points most distant on the color space in each image area percentage is represented as in-plane color difference $\Delta E$.

Figure 4A:
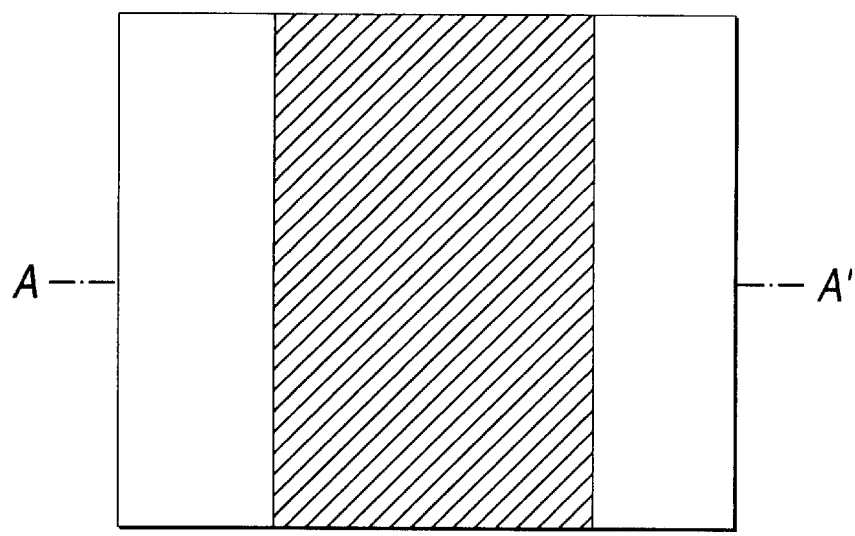
FIGS. 4(A)–(B) is illustrations of the edge width.
Figure 4B:
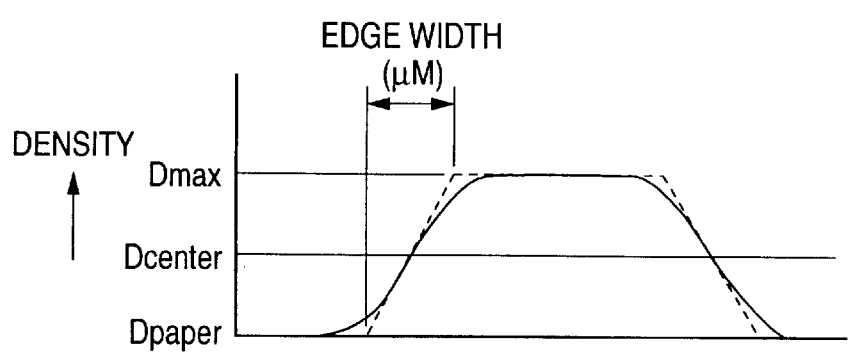

FIG. 4 is illustrations of the edge width; FIG. 4A is an enlarged view of a line drawing, and FIG. 4B is a graph to show the image density in the cross section taken on line A-A' in FIG. 4A.

As shown in FIG. 4B, the image density of the line drawing does not show steep change and changes drawing a moderate curve in the vicinity of the edge between ground and colored portions. The distance between the intersections of the maximum and minimum density levels of the tangent line at the center of the maximum and minimum densities of the change curve is defined as the edge width ($\mu m$). The edge width is an index for quantitatively representing edge sharpness of a line drawing, namely, a blur of a line drawing. If the edge width is small, it means a sharp line drawing; if the edge width is large, it means a blurred line drawing.

Figure 2B:
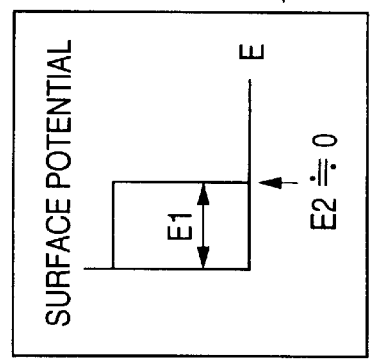

In the area in which the ratio E2/E1 is less than 0.3, the light energy width in the responsive area E2 is extremely small with respect to the light energy width in the dead area E1 and the charge potential abruptly becomes zero, as shown in FIG. 2B. Thus, as shown in the upper left corner of the graph in FIG. 2A as the broken line circle, the gradation representation in the extreme highlight portion (Cin<10%) become steep and the color difference increases and if an unevenness of light beam irradiation energy, etc., exists, the gradation representation easily becomes manifest as a density unevenness.

On the other hand, in the area in which the ratio E2/E1 exceeds 1.3, the light energy width in the dead area E1 becomes small with respect to the light energy width in the responsive area E2, as shown in FIG. 2C. As with a photosensitive body having no dead area, clear characters and good dots and full lines are not reproduced. For example, when the ratio E2/E1 is 0.1, the edge width is 26 $\mu m$, while if the ratio E2/E1 is increased to 3.0, the edge width is 45 $\mu m$ (not shown). In the invention, the upper limit of the ratio E2/E1 is set to 1.3 at which the edge width can be held 30 $\mu m$ or less, but preferably the ratio E2/E1 is less than 1.0 from the viewpoint of line and character reproducibility. In the area in which the ratio E2/E1 exceeds 1.3, as shown in the upper right corner of the graph in FIG. 2A as the broken line circle, the color difference in the medium and high density portions (Cin>30%) increases, thus preferably the ratio E2/E1 is also less than 1.3 from the point of gradation stability (color uniformity).

On the other hand, if the ratio of the light energy width in the dead area E1 to the light beam energy setup value E0, E1/E0, is less than 0.13 (almost equivalent to $1/e^2$), the light energy width in the dead area E1 is small as compared with the light beam energy setup value E0 and the weak exposure energy strength portion is not sufficiently cut off, thus clear characters and good dots and full lines are not reproduced, or the light beam energy setup value E0 is set excessively as compared with the light energy width in the dead area E1, thus the image density is saturated in the medium and high density portions and good gradation reproduction is not enabled.

FIG. 5 is graphs to show the relationship between the ratio of the light energy width in the dead area E1 to the light beam energy setup value E0, E1/E0, and the line and character reproducibility. Here, the edge width ($\mu m$) is selected as an index representing the line and character reproducibility.

Figure 5A:
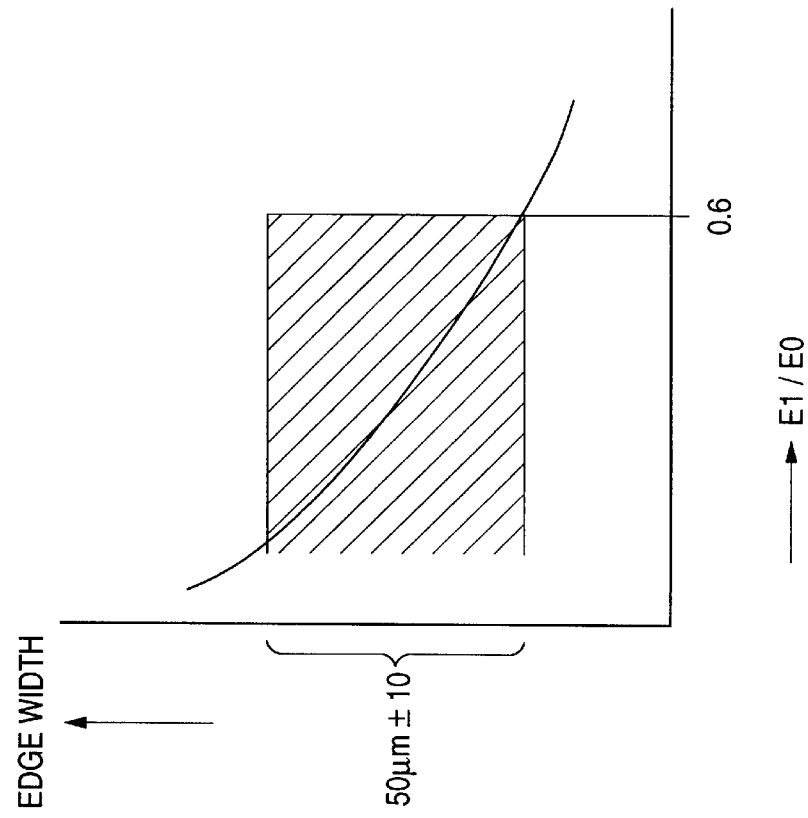
FIGS. 5(A)–(B) is graphs to show the relationship between the ratio of the light energy width in dead area E1 to light beam energy setup value E0, E1/E0, and the line and character reproducibility.

As shown in FIG. 5A, if the ratio of the light energy width in the dead area E1 to the light beam energy setup value E0, E1/E0, is less than 0.13 (almost equivalent to $1/e^2$), the edge width lowers to 30 $\mu m$ or less, the line or character edges are too sharp, and a part thereof is discarded. Then, in the invention, the lower limit of the ratio E1/E0 is set to 0.2.

Figure 5B:
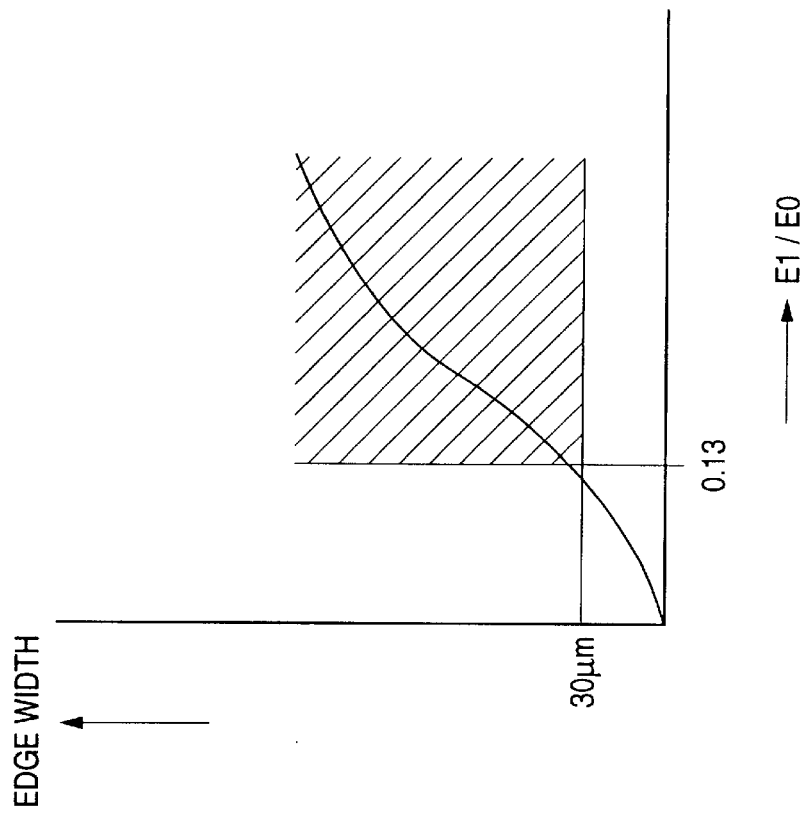

On the other hand, as shown in FIG. 5B, the ratio of the light energy width in the dead area E1 to the light beam energy setup value E0, E1/E0, exceeds 0.6, the light energy width in the dead area E1 is too large, the cut-off portion increases, the edge width falls below the range of 50±10 $\mu m$, and lines, dots, etc., become thin or faint, or the light beam energy setup value E0 is set so small as compared with the light energy width in the dead area E1 that the low density portion is not reproduced and the image density in the high density portion is not sufficient; good gradation reproduction is not enabled.

Then, in the invention, the ratio E1/E0 is set to less than 0.6; preferably it is less than 0.5 from the viewpoint of line and character reproducibility.

Preferably, the photosensitive body used with the image formation apparatus of the invention has a photosensitive layer consisting of a charge generation layer for generating charges, a light potential attenuation control layer for storing charges poured when the poured charge amount is relatively small and transporting charges poured when the poured charge amount is relatively large, and a charge transport layer for transporting charges on a substrate.

In doing so, also in an image formation method of the invention, the light potential attenuation control layer stores light carriers generated from the charge generation layer and when the storage amount reaches saturation, starts releasing the light carriers. The storage capability of the light potential attenuation control layer determines the light energy width in the dead area. On the other hand, the potential is attenuated as the light carriers passing through the light potential attenuation control layer arrive at the surface of the photosensitive body. That is, the light energy width in the responsive area representing potential attenuation is determined by the light carrier generation capability of the charge generation layer. Thus, the light energy widths in the dead and responsive areas can be controlled almost independently of each other and an adjustment can be made so as to satisfy the relations $0.3<E2<E1<1.3$ and $0.2<E1<E0<0.6$.

Further, preferably the photosensitive body used with the image formation apparatus of the invention has the layers adjusted to thicknesses so as to satisfy $$0.01 \leq x/L \leq 0.5$$

where x is the thickness of the light potential attenuation control layer and L is the thickness of the photosensitive layer, namely, the total film thickness of the charge generation layer, the light potential attenuation control layer, and the charge transport layer.

In the area in which x/L is less than 0.01, the light potential attenuation control layer is so thin that the light energy width in the dead area E1 becomes narrow and as with a photosensitive body having no dead area, clear characters and good dots and full lines are not reproduced. On the other hand, in the area in which x/L exceeds 0.5, the light potential attenuation control layer is so thick that it takes time in moving light carriers in the light potential attenuation control layer; the potential is not attenuated, the light energy width in the responsive area E2 increases, and the relation $E2<E1<1.3$ cannot be satisfied. The time required from irradiation with light to potential attenuation exceeds the general practical limit 300 msec and the photosensitive body is not practical. x/L is set to greater than or equal to 0.01 and less than or equal to 0.5, whereby a practical photosensitive body having a dead area can be realized.

Preferably, the light potential attenuation control layer in the image formation apparatus of the invention comprises charge transport domains dispersed in an electric inactive matrix, and the volume percentage of the charge transport domains in the light potential attenuation control layer is adjusted to greater than or equal to 20% and less than or equal to 50%. If the volume percentage of the charge transport domains exceeds 50%, it becomes difficult to store light carriers, the light energy width in the dead area E1 decreases, and the relation $E2<E1<1.3$ cannot be satisfied. Thus, as with a photosensitive body having no dead area, clear characters and good dots and full lines cannot be reproduced. The volume percentage of the charge transport domains is set to less than or equal to 50%, whereby it becomes possible to store sufficient light carriers and the light energy width in the dead area E1 can be formed. On the other hand, if the volume percentage of the charge transport domains is set to less than 20%, passage of light carriers generated in the charge generation layer is blocked, the potential is not attenuated, the light energy width in the responsive area E2 increases, and the relation $E2<E1<1.3$ cannot be satisfied. Irradiation with a large amount of light energy is executed in order to attenuate the potential and the light energy width in the dead area E1 becomes relatively small although it does not actually change. As with a photosensitive body having no dead area, clear characters and good dots and full lines cannot be reproduced.

Preferably, the exposure means in the image formation apparatus of the invention irradiates the photosensitive body with the above-mentioned light beam so as to satisfy the relation $$Dbh/Dsh \leq 1/2$$

$$0.7 \leq Dbv/Dsv \leq 1.3$$

where Dbh is the beam diameter of the light beam in the main scanning direction, Dsh is the pixel pitch in the main scanning direction, Dbv is the beam diameter in the sub scanning direction, and Dsv is the pixel pitch in the sub scanning direction. The pixel pitch in the main scanning direction refers to a pixel unit repetition pitch of a potential distribution in the main scanning direction when a halftone electrostatic latent image is formed. The pixel pitch in the sub scanning direction refers to a pixel unit repetition pitch of a potential distribution in the sub scanning direction when a halftone electrostatic latent image is formed. The beam diameter refers to the diameter of a circle formed by connecting the points where the light energy strength when a plane is irradiated with the light beam is the maximum value $1/e^2=13.5\%$.

The exposure means is set so as to satisfy the relation of $Dbh/Dsh \leq 1/2$ as described above, whereby gradation representation containing a highlight portion becomes furthermore smooth and stable. The lower limit of Dbh/Dsh is not placed from the viewpoint of good and stable gradation representation containing a highlight portion. On the other hand, if the beam diameter in the sub scanning direction is made too small, toner is deposited only as much as the ratio of the beam diameter in the sub scanning direction to the pixel pitch in the sub scanning direction and the maximum density that can be represented lowers, resulting in narrowing the dynamic range of gradation. Thus, preferably Dbv/Dsv is 0.7 or more. The reason why the upper limit of Dbv/Dsv is set to 1.3 is that if the beam diameter in the sub scanning direction is widened exceeding 1.3, crosstalk between pixels adjacent to each other in the sub scanning direction becomes a problem.

Preferably, developing means in the image formation apparatus of the invention causes a developer comprising magnetic particles and toner mixed to come in contact with or approach the photosensitive body at a developing position, thereby depositing the toner on the photosensitive body in a pattern responsive to an electrostatic latent image formed on the photosensitive body. The terms "contact" and "approach" in the phrase "causes a developer comprising magnetic particles and toner mixed to come in contact with or approach the photosensitive body" are used to mean the state satisfying $1 \leq T/S$ and the state satisfying $0.8 \leq T/S<1$, respectively, where S is the distance between the photosensitive body and an developer support and T is the thickness of the developer layer at the developing position. Such a developing apparatus in the contact or approach state is adopted, whereby faithful reproduction high in following-up property of an electrostatic latent image is executed and furthermore clear character reproduction and a smooth image high in granularity with clear dots and full lines can be provided. In contrast, if a non-contact developing apparatus wherein a developer is placed at a position distant from a photosensitive body and toner is spattered is adopted, the toner is splashed and it is difficult to reproduce clear lines, dots, and full lines.

Preferably, the developing means in the image formation apparatus of the invention can develop in any color toner among different color toners and develops in any one color toner for each electrostatic latent image and the image formation apparatus comprises transfer means for transferring visible images in color toners formed on the photosensitive body onto a predetermined transfer body in sequence in overlapped relation.

Preferably, used as the photosensitive body is a photosensitive body having a photosensitive layer consisting of a charge generation layer for generating charges, a light potential attenuation control layer for storing charges poured when the poured charge amount is relatively small and transporting charges poured when the poured charge amount is relatively large, and a charge transport layer for transporting charges on a substrate.

Figure 6:
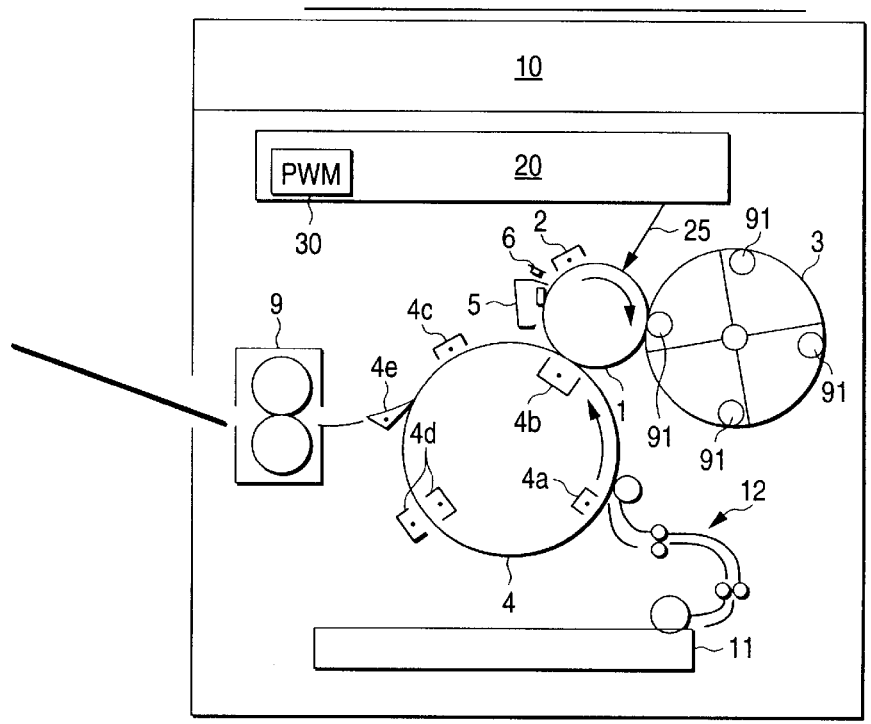
FIG. 6 is a schematic diagram to show the configuration of a color copier to which the invention is applied.

FIG. 6 is a schematic diagram to show the configuration of a color copier containing one embodiment of the image formation apparatus of the invention.

An original document is set face down on the top of an original document read section 10 and an image described on the original document is read photoelectrically through the original document read section 10 for forming an image signal.

A light beam scan section 20 generates a light beam 25 modulated on/off based on the image signal and scans the light beam 25 repeatedly over a photosensitive drum 1 rotating in the arrow direction in the main scanning direction perpendicular to the rotation direction of the photosensitive drum 1 (sub scanning direction), namely, in the direction perpendicular to the paper face.

The photosensitive drum 1 is charged uniformly by an electrostatic latent image formation charger 2, then is scanned repeatedly in the main scanning direction by the light beam 25 from the light beam scan section 20. The light beam 25 is modulated on/off by a light beam pulse width modulation circuit 30 in response to the image signal. The photosensitive drum 1 is exposed by the light beam 25 and an electrostatic latent image is formed on the photosensitive drum 1. The electrostatic latent image formed on the photosensitive drum 1 moves to a developing position opposed to a rotary developing unit 3, which is made up of four developing devices having yellow, cyan, magenta, and black toners. Each developing device adopts a reverse rotation developing apparatus using dual-component magnetic brush developing. In the embodiment, the developing unit of the reverse developing apparatus using dual-component magnetic brush developing is taken as an example. However, the developing unit in the invention is not limited to the reverse developing apparatus using dual-component magnetic brush developing and can also be applied to a developing unit using a single-component developer or a developing unit of a forward rotation developing apparatus. The average particle diameter of toner used in the embodiment is 7 $\mu$m. It may be about 10 $\mu$m as the toner particle diameter of toner used in a normal electrophotographic process, but preferably it is 7 $\mu$m or less from the point of image quality. Each time an electrostatic latent image corresponding to each color is developed, the rotary developing unit 3 rotates for developing the electrostatic latent image in the toner corresponding to the color. At this time, a bias voltage is applied to a developing roll 3a used for developing for suppressing toner deposition on the background of the electrostatic latent image.

The toner image provided by the developing moves to a transfer position opposed to a transfer drum 4 as the photosensitive drum 1 rotates.

Recording paper (not shown) transported via a predetermined paper transport passage 12 from a paper tray 11 is attracted on the outer peripheral surface of the transfer drum 4 by the action of a paper attraction charger 4a and is transported to a transfer position opposed to the photosensitive drum 1 as the transfer drum 4 rotates in the arrow direction. The toner image formed on the photosensitive drum 1 is electrostatically transferred at the transfer position onto the recording paper attracted on the outer peripheral surface of the transfer drum 4 by the action of the paper attraction charger 4a. After the transfer, the photosensitive drum 1 is cleaned by a cleaner 5 for removing the remaining toner, is irradiated with light by a pre-exposure device 6 for removing electricity, and again is charged by the electrostatic latent image formation charger 2 for the next electrostatic latent image formation. On the other hand, while yellow, cyan, magenta, and black toner images are formed on the photosensitive drum 1 in sequence, one sheet of recording paper is attracted on the transfer drum 4 and rotates with the rotation of the transfer drum 4. The sheet of recording paper attracted on the transfer drum 4 is also transported to the transfer position in synchronization with each color toner image arriving at the transfer position and the color toner images are transferred onto the sheet of recording paper in sequence in overlapped relation.

At the termination of transferring the yellow, cyan, magenta, and black toner images onto the sheet of recording paper attracted on the transfer drum 4, the electrostatic attraction force of the sheet of recording paper attracted on the transfer drum 4 on the transfer drum 4 is removed by a stripping-off charger 4c. The sheet of recording paper is stripped off from the transfer drum 4 by a stripping-off claw 4e, is fixed by a fuser 9, and is transported to the outside of the apparatus. On the other hand, the transfer drum 4 from which the recording paper is stripped off is subjected to electricity removal by an electricity removal charger 4d. When image formation is again executed, another sheet of recording paper is attracted as described above.

Figure 7:
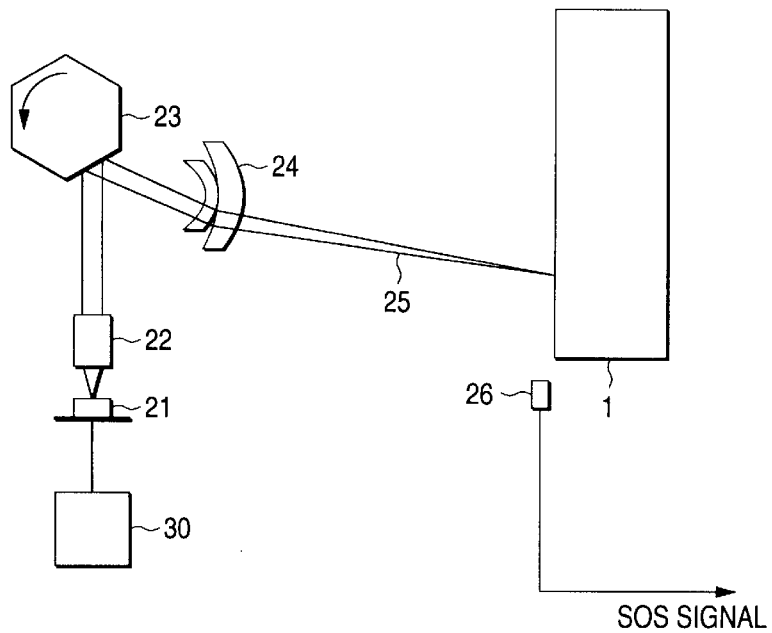
FIG. 7 is a schematic diagram to show the configuration of a light beam scan section.

FIG. 7 is a diagram to show the configuration of the light beam scan section 20.

A laser beam controlled on/off by the light beam pulse width modulation circuit 30 is emitted from a semiconductor laser 21. It is collimated by a collimator lens 22 and is repeatedly reflected and deflected by a polygon mirror 23 rotating in the arrow direction. Further, the laser beam passes through a f$\theta$ lens 24 for a spot diameter adjustment on the photosensitive drum 1 and is scanned repeatedly over the photosensitive drum 1 in the main scanning direction (sub direction in FIG. 7) as a light beam 25 supporting image information. The start time point of each scanning of the light beam 25 is sensed by a scan start signal generation optical sensor 26 and is read into the inside as an SOS (start of scan) signal representing the start of each scanning.

Figure 8:
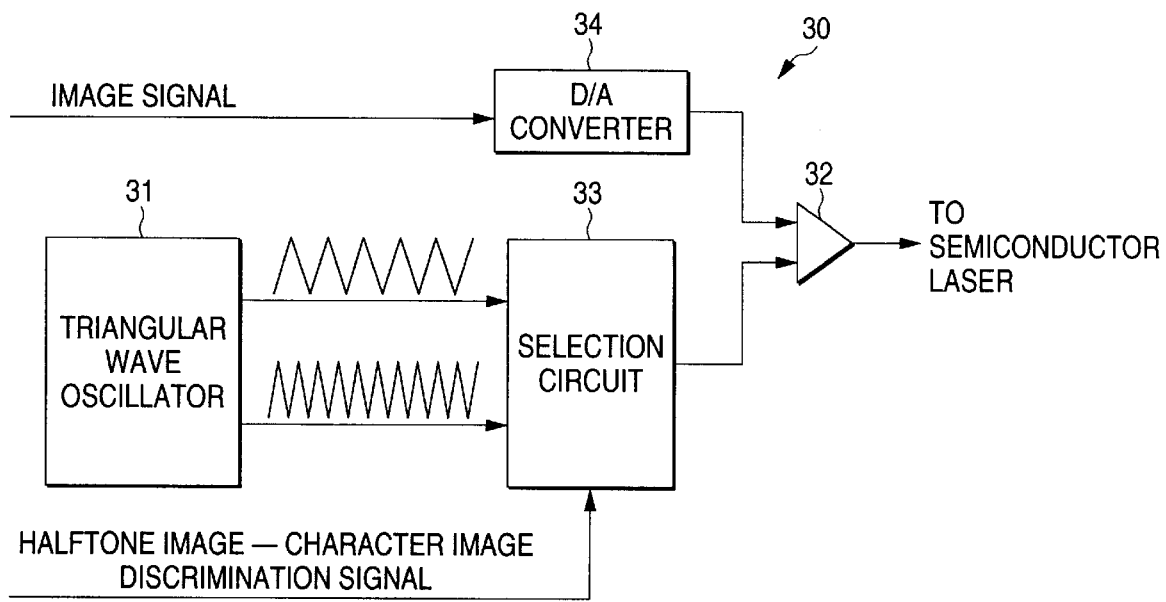
FIG. 8 is a circuit block diagram to show one example of a pulse width modulation circuit.

FIG. 8 is a circuit block diagram of the light beam pulse width modulation circuit 30.

As shown in FIG. 8, the light beam pulse width modulation circuit 30 comprises a triangular wave oscillator 31, a comparator 32, a waveform selection circuit 33, and a D/A converter 34. The triangular wave oscillator 31 generates two types of triangular waves different in repetitive frequency as shown in the figure and inputs them to the waveform selection circuit 33. The waveform selection circuit 33 selects the triangular wave having the low repetitive frequency for a halftone image or the triangular wave having the high repetitive frequency for a character image based on a discrimination signal for discriminating between the halftone image and character image (binary image), and transfers the selected triangular wave to the comparator 32. On the other hand, an image signal (digital signal) provided by reading an image on an original document through the original document read section 10 is input to the D/A converter 34, which then converts the image signal into an analog signal and inputs the analog signal to the comparator 32. The comparator 32 compares the analog image signal level with the triangular wave level and converts into a binary signal of the pulse width responsive to the analog image signal level. The binary signal is input to the semiconductor laser 21 shown in FIG. 7, from which a laser beam repeating on and off in response to the binary signal is emitted. In the apparatus, one cycle of the triangular wave corresponds to the pixel pitch in the main scanning direction.

Figure 9:
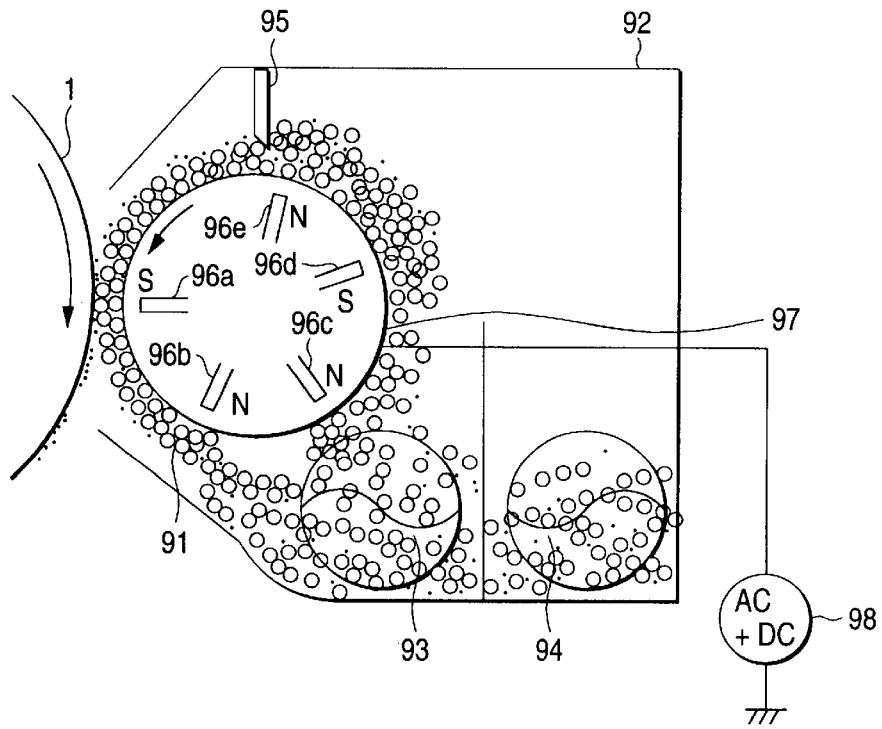
FIG. 9 is a schematic diagram to show the structure of a developing device.

FIG. 9 is a diagram to show the structure of one of the four developing devices making up the rotary developing unit 3 shown in FIG. 6.

The developing device comprises a cylindrical developing roll 91 rotating with a developer supported on the surface, thereby transporting the developer, a developer regulation member 95 for regulating the amount of the developer deposited on the surface of the developing roll 91, and screw augers 93 and 94 rotating, thereby agitating and transporting the developer for supplying the developer to the developing roll 91 in a housing 92 for storing the developer with magnetic particles and toner mixed.

The developing roll 91 comprises a sleeve 97 containing a fixed magnet roll and supported for rotation in the surroundings of the magnet roll. The sleeve 97 is placed facing the photosensitive body 1 and spaced 0.5 mm away therefrom. Developing is executed in the portion where the surfaces of the sleeve 97 and the photosensitive body 1 approach each other. The magnet roll disposed inside the sleeve has a plurality of magnetic poles 96a, 96b, . . . , 96e for forming a magnetic brush of magnetic particles on the surface of the sleeve 97 by magnetic field formed between the adjacent magnetic poles. The sleeve 97 transports the developer as it rotates.

A developing bias voltage comprising AC superposed on DC is applied to the developing roll 91 from an AC-superposed-on-DC voltage power supply 98. An electric field formed at the developing position approaching the photosensitive drum 1 causes charged toner to be deposited on an electrostatic latent image formed on the photosensitive drum 1. The applied voltage has a DC component of the same polarity as the photosensitive body charge potential and is set so that developing potential contrast with respect to the full exposure part potential of the photosensitive drum 1 (the difference between the DC component of the developing bias voltage and the full exposure part potential of the photosensitive drum 1) becomes about 300 V.

The spacing between the developer regulation member 95 and the developing roll 91 is set so that the developer layer height at the position where the photosensitive drum 1 and the developing roll 91 are the nearest to each other becomes 2.0 mm in the state in which the developing roll 91 is placed sufficiently apart from the photosensitive drum 1.

The AC component of the developing bias voltage has amplitude value 1.2 kV (peak-to-peak value) and frequency 6 kHz; a rectangular wave is used as the waveform.

The developer used here is a mixture of toner of average particle diameter 7 $\mu$m and magnetic particles (ferrite carriers) of average particle diameter 50 $\mu$m, and the toner concentration is 7%.

FIG. 10 is schematic diagrams of the basic philosophy concerning conventional gradation reproduction and the basic philosophy according to the invention.

Figure 10A:
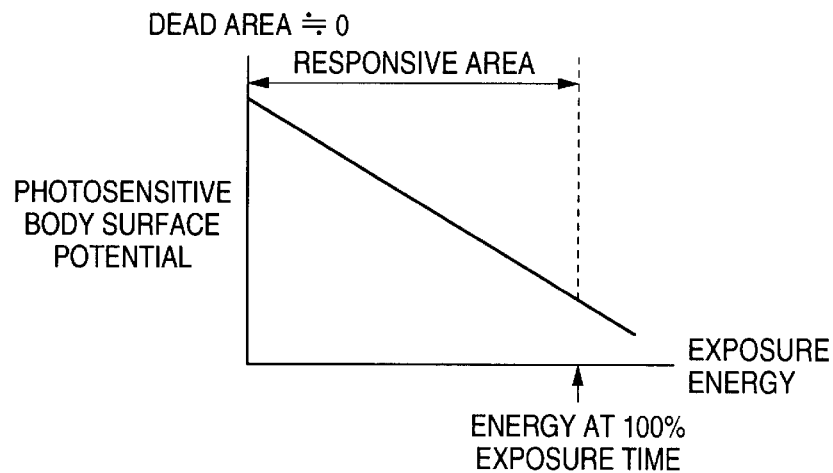
FIG. 10(A)–(C) is schematic diagrams to explain the difference between the basic philosophy in conventional image formation apparatuses and the basic philosophy according to the invention.

In the conventional so-called analog copiers, a photosensitive body responding to exposure energy linearly is ideal from the point of gradation reproduction of a halftone image, as shown in FIG. 10A.

Figure 10B:
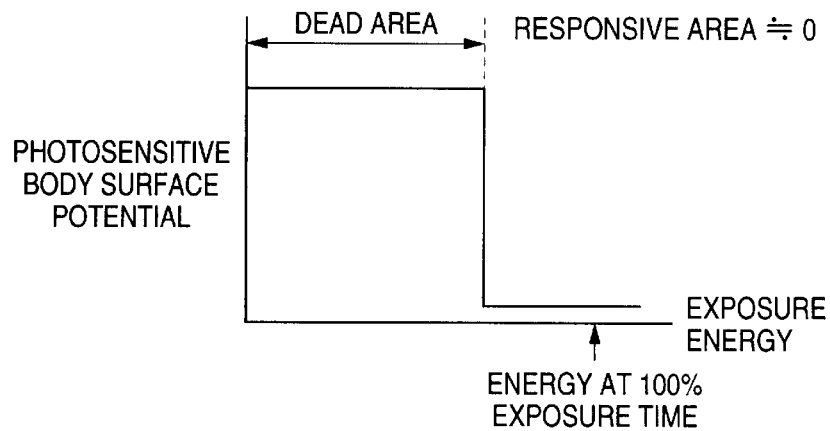

In the electrophotographic apparatuses for digital exposure described in the Unexamined Japanese Patent Application Publications Nos. Hei. 1-169454, 2-282277, etc., mentioned above, a photosensitive body having a dead area and responding binarily is ideal from the point of clear reproduction of character images, as shown in FIG. 10B.

Figure 10C:
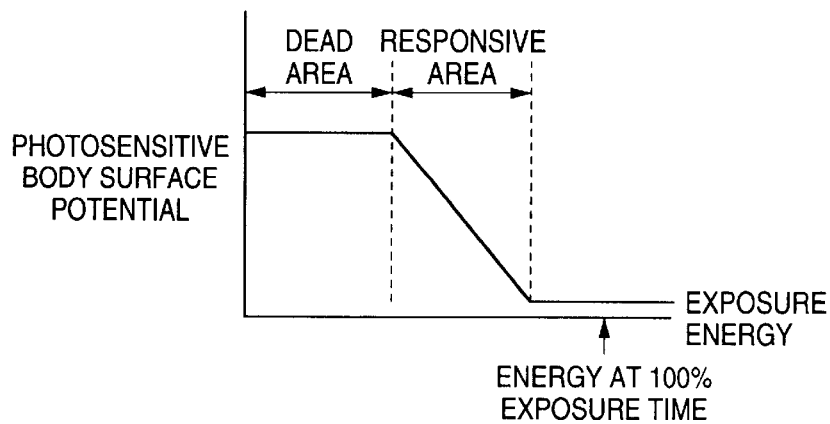

In contrast, in the embodiment, as shown in FIG. 10C, a photosensitive body having both a dead area in which the photosensitive body surface potential little responds to exposure energy and a responsive area changing linearly is used and exposure energy at the 100% exposure time is set in the saturation portion of the photosensitive body surface potential, whereby both character and halftone images are well represented under practical beam exposure conditions.

Dot and line reproduction according to the basic philosophies in FIGS. 10A to 10C will be discussed for showing the fact that the basic philosophy in FIG. 10C (the embodiment) is excellent as compared with the basic philosophies in FIGS. 10A and 10B (control examples).

FIG. 11 shows exposure energy profiles of light beams for exposing photosensitive bodies.

Figure 11A:
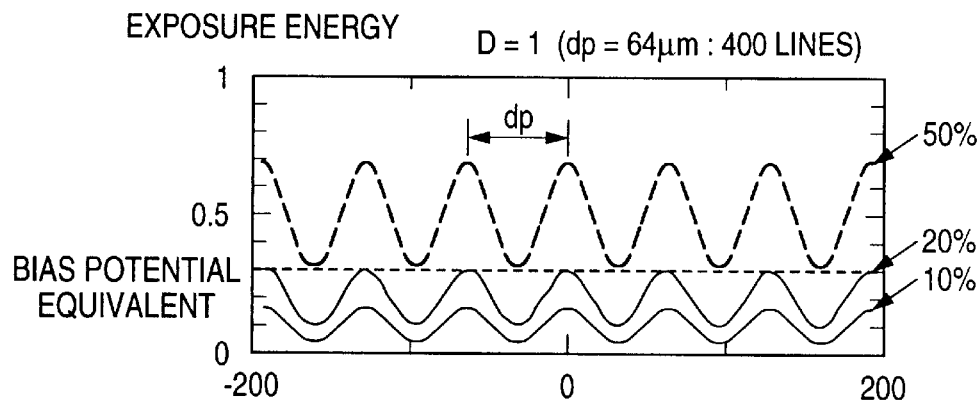
FIGS. 11(A)–(C) is graphs to show exposure energy profiles.
Figure 11B:
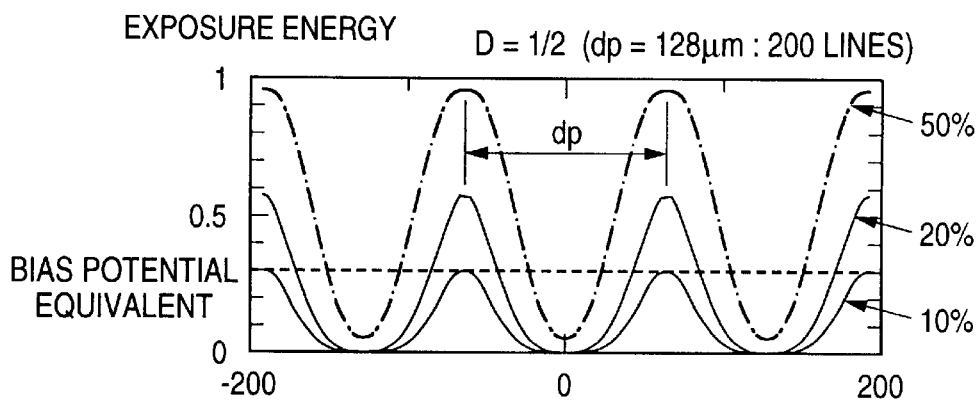
Figure 11C:
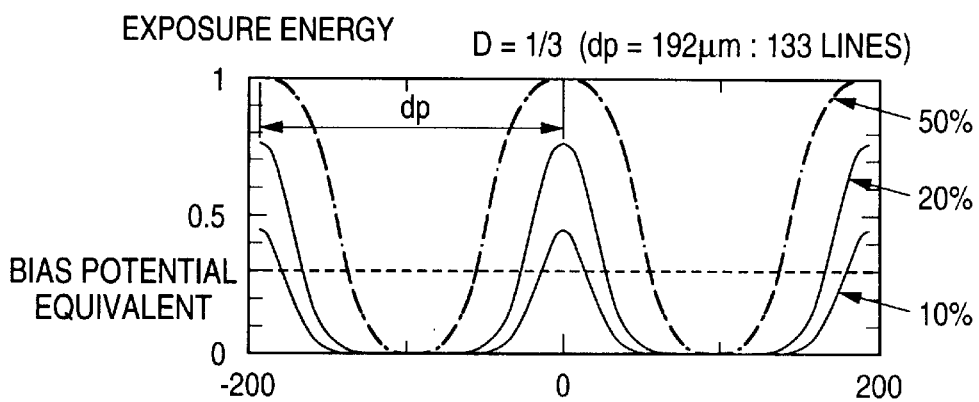

FIGS. 11A to 11C show the results when the values of D are 1/1, 1/2, and 1/3 when light beam spot diameter db ($\mu$m) is constant and the ratio between distance between adjacent pixels, dp ($\mu$m), and the light beam spot diameter db ($\mu$m) is D; each of (a)–(c) shows the exposure energy profiles when the on pulse width percentage to the distance between adjacent pixels dp ($\mu$m) (accurately a value resulting from converting the time for the light beam pulse width modulation circuit 30 (see FIG. 8) to attempt to control to the on state for emitting a laser beam from the semiconductor laser 21 into the scan distance on the surface of the photosensitive drum 1) is 50%, 20%, and 10%.

As noticeable in FIG. 11A, the exposure energy profiles are not binary (digital) and become dull (analog) profiles containing a weak exposure energy strength portion. As the pulse width (%) is lessened, the exposure energy profile contrast lowers.

Figure 12:
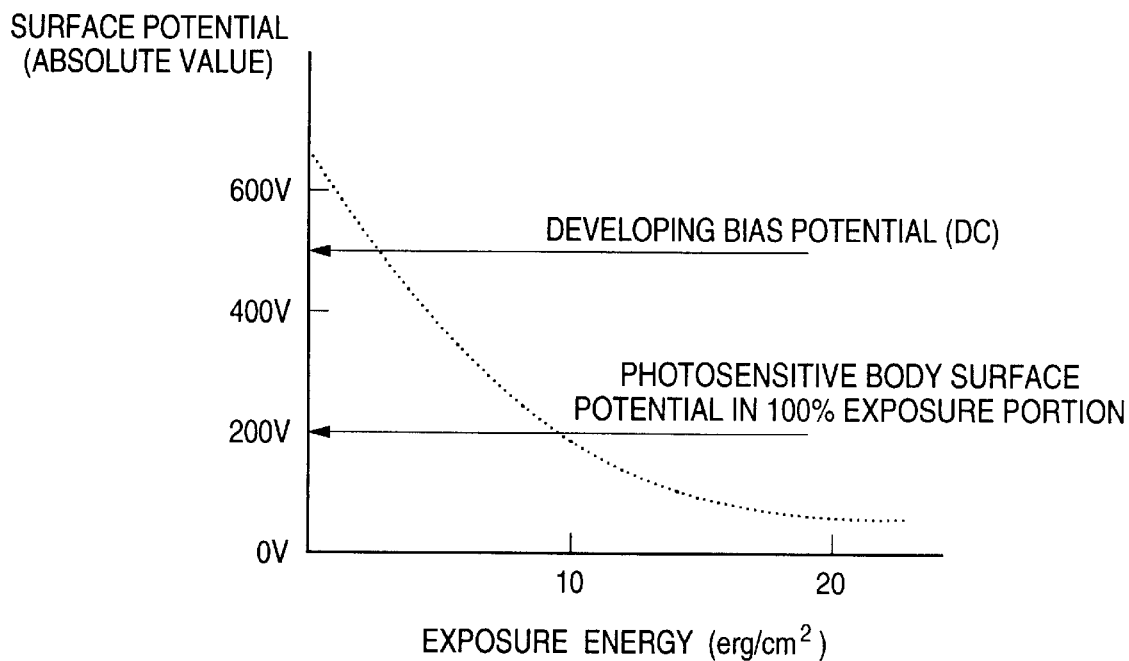
FIG. 12 is a graph to show the light response characteristic and bias setting of a photosensitive body in the prior art.

FIG. 12 is a graph to show the characteristics of a photosensitive body used with conventional so-called analog copiers; a photosensitive body of characteristics along the concept in FIG. 10A is shown.

To reproduce a halftone image by using a photosensitive body having a roughly linear light potential attenuation characteristic as shown in FIG. 12, the surface potential profile of the photosensitive body becomes almost similar to the exposure energy profile shown in FIG. 11. It becomes a dull (analog) surface potential profile. As seen in FIGS. 11B and 11C, as the value of D is decreased to 1/2 and 1/3, the dullness is improved, but the surface potential profile is still analog; the developed toner is easily scattered and a rough halftone image low in granularity is provided.

To reproduce a character image, the character image, as noticeable in kanji characters, is made up of on, off repetitions of lines and becomes similar to the exposure energy profile when the on pulse width (%) is 50%. Thus, the developed toner is easily scattered and unclear character image quality results as with the halftone image reproduction as described above.

Figure 13:
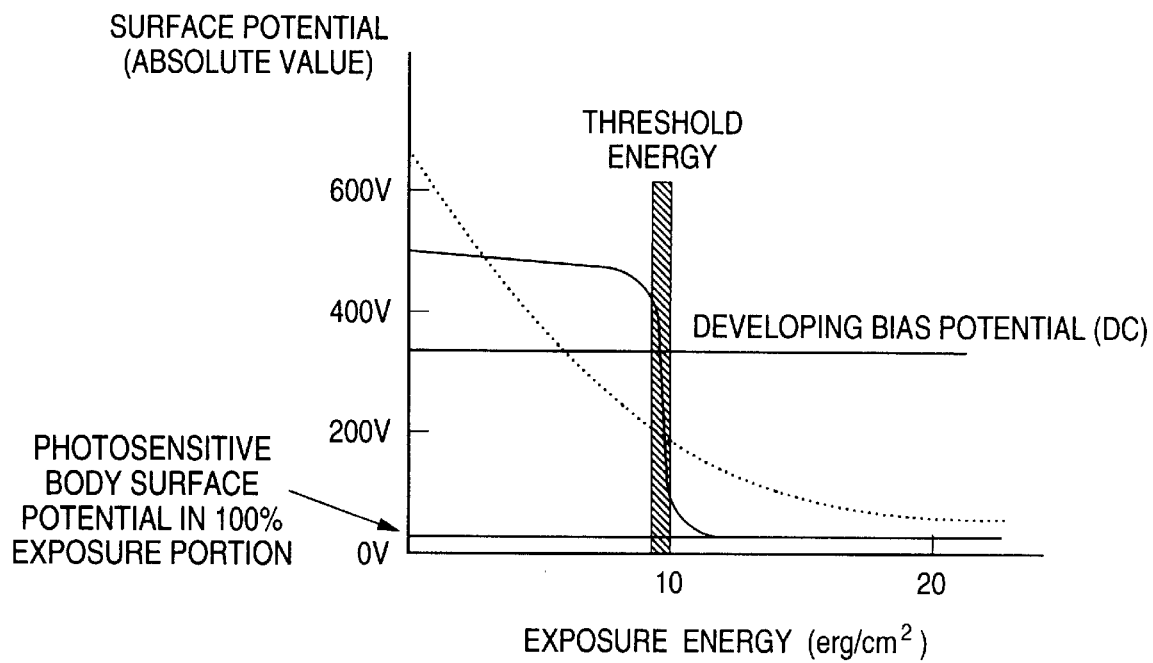
FIG. 13 is a chart to explain problems in the conventional image formation apparatuses.

On the other hand, FIG. 13 is a chart to show the characteristics of a photosensitive body for realizing the basic philosophy proposed in the Unexamined Japanese Patent Application Publications Nos. Hei. 1-169454 and 2-282277 mentioned above (see FIG. 10B).

Figure 14A:
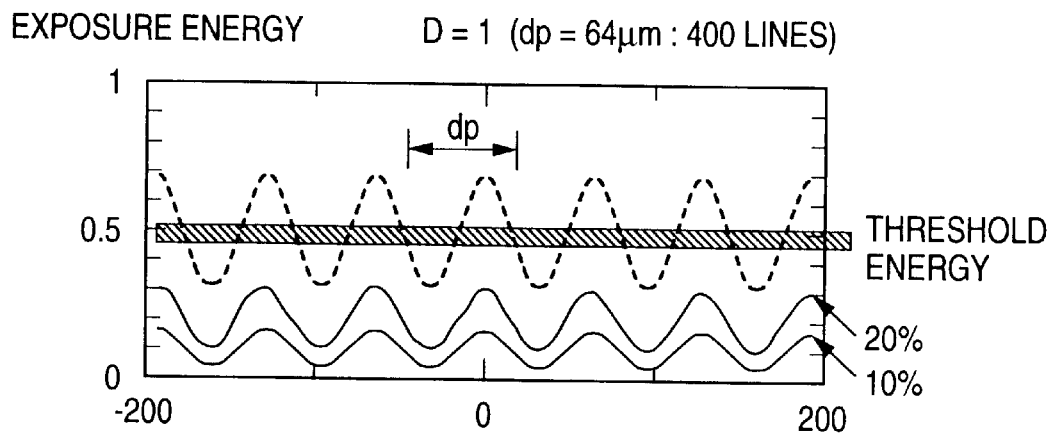
FIG. 14A is a graph to show an exposure energy profile.

FIG. 14A is a graph to show an exposure energy profile when D=1/1 also shown in FIGS. 11A and 11B is a graph to show the simulation result of the potential profile of an electrostatic latent image formed on a photosensitive body having the light potential attenuation characteristic shown in FIG. 13 when the photosensitive body is exposed to a light beam having the exposure energy profile shown in FIG. 14A.

Figure 14B:
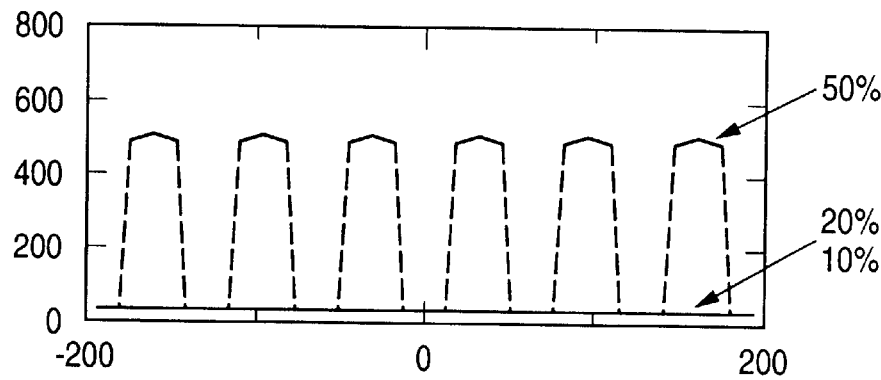
FIG. 14B is a graph to show a potential profile of an electrostatic latent image.

To use a photosensitive body having a light potential attenuation characteristic abruptly responding in predetermined threshold energy as shown in FIG. 13, in the area exceeding threshold energy shown in FIG. 14A, contrast of the exposure energy profile is maintained and the surface potential profile of the photosensitive body is also digital, as shown in FIG. 14B; the developed toner becomes hard to be scattered and clear character reproduction and halftone image reproduction excellent in granularity with clear dots and full lines are enabled.

However, no images are reproduced in the area not exceeding the threshold energy. That is, if the value of D is 1/1, even 20% highlight area is not reproduced. As the value of D is decreased to 1/2 and 1/3, gradation representation in the highlight area is enabled; still, the beam diameter needs to be made small. Particularly, to represent a 10% image and provide a dynamic range of gradation, the beam diameter must be narrowed until the value of D is set to about 1/4. Highlight can also be reproduced by setting high light beam output; in this case, however, the dynamic range related to gradation reproduction narrows, resulting in saturation of the density of medium and high density portions.

As previously known, to form a high-quality image, representation of a highlight portion is important; particularly the highlight portion needs to be precisely represented because of development in recent DTP (desk top publishing) for making a hard copy of a displayed screen intact. Assuming that an image formation apparatus of pixel density 300 dpi (dots per inch) allowable as the image quality level of a character image is realized, if an attempt is made to represent gradation of pulse width 10% by narrowing the beam diameter, the beam diameter in the main scanning direction is required to be about 20 $\mu$m; it is substantially difficult to realize.

Figure 15:
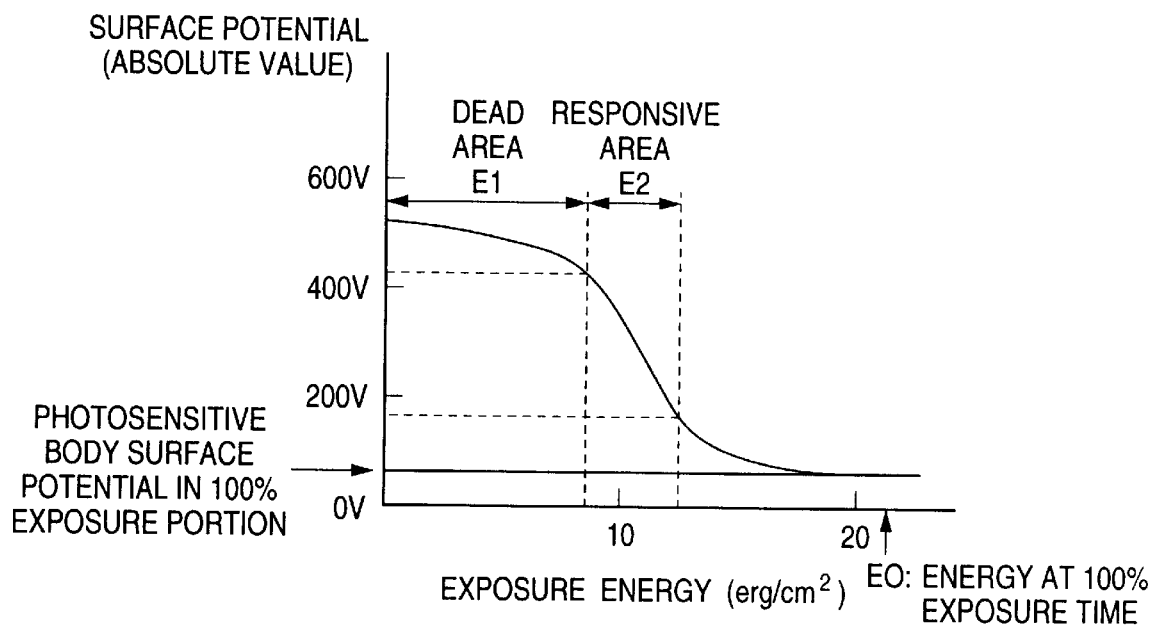
FIG. 15 is a chart to show the light potential attenuation characteristic and bias setting of a photosensitive body that can be adopted for the embodiment of the invention.

FIG. 15 is a chart to show the characteristics of a photosensitive body that can be adopted for the embodiment of the invention.

To use the photosensitive body showing the light potential attenuation characteristic shown in FIG. 15, if the value of D is abut 1/2, dots and full lines of pulse width 10% can be represented stably and the surface potential profile of the photosensitive body is also more digital; resultantly, scattering of the developed toner also lessens.

Using the photosensitive body showing such light potential attenuation characteristic, the image formation apparatus of the invention can provide smooth and stable gradation representation and the image formation apparatus for forming color images can provide stable hue in the highlight portion.

Figure 16A:
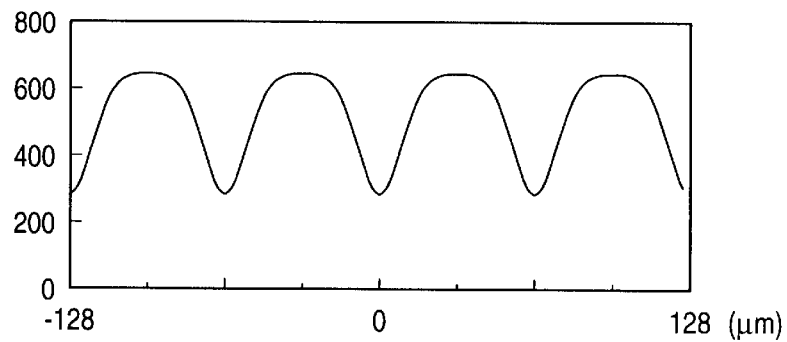
FIGS. 16(A)–(C) is graphs to show potential profiles of electrostatic latent images.
Figure 16B:
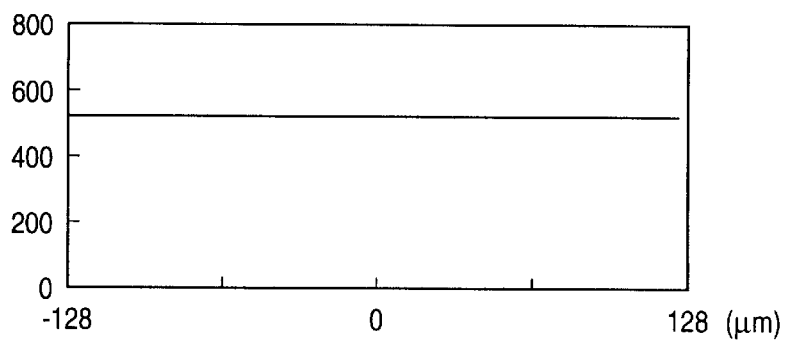
Figure 16C:
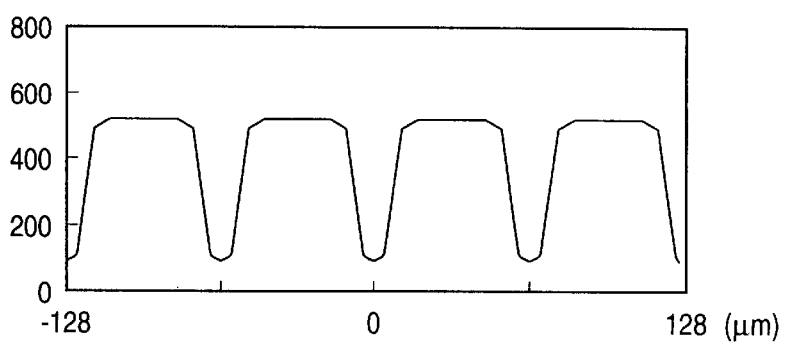

FIGS. 16A to 16C show the simulation results of the potential profiles of electrostatic latent images formed on the photosensitive bodies when a light beam modulated by an image signal corresponding to the same highlight portion is scanned over the photosensitive body showing the roughly linear light potential attenuation characteristic shown in FIG. 12, the photosensitive body showing the roughly binary light potential attenuation characteristic shown in FIG. 13, and the photosensitive body showing the light potential attenuation characteristic shown in FIG. 15.

As seen by comparing FIGS. 16A to 16C, according to the embodiment (FIG. 16C), the highlight portion is not missing and a clear electrostatic latent image is formed, whereby smooth gradation representation in the highlight portion, clear character reproduction, and image reproduction excellent in granularity with clear dots and full lines are enabled.

EXAMPLES

Examples of the invention and control examples will be discussed.

FIG. 17 is sectional views to show structures of photosensitive bodies. The photosensitive bodies used in the examples of the invention and control examples will be discussed with reference to FIG. 17, next the examples of the invention and control examples will be discussed.

The photosensitive bodies A–K and M to be discussed are photosensitive bodies showing a light potential attenuation characteristic in which potential attenuation is hard to occur when weak light is input and when certain light input is exceeded, occurs in response to it, a so-called S-letter light potential attenuation characteristic with a light potential attenuation curve responding to input exposure energy having a curve point.

The photosensitive body L is a generally used photosensitive body of function separation type consisting of a charge generation layer and a charge transport layer using an organic semiconductor indicating so-called J-letter potential attenuation roughly proportional to the incident light amount.

The light potential attenuation control layer mentioned in the invention comprises charge transport domains dispersed in an electric inactive matrix and is a nonuniform apparatus consisting of an electric inactive phase and a charge transport phase. A specific example of the light potential attenuation control layer comprises a material having a charge transport function dispersed in an insulation resin (electric inactive matrix) in a microcrystal (charge transport domain) state, but the light potential attenuation control layer is not limited to it.

The charge transport layer mentioned in the invention comprises a charge transport matrix and is a uniform apparatus of only one charge transport phase. Specific examples of the charge transport layer are a material having a charge transport function fixedly fused in a binding resin in a molecular state and a charge transport polymer, but the charge transport layer is not limited to them.

Photosensitive body A

Figure 17A:
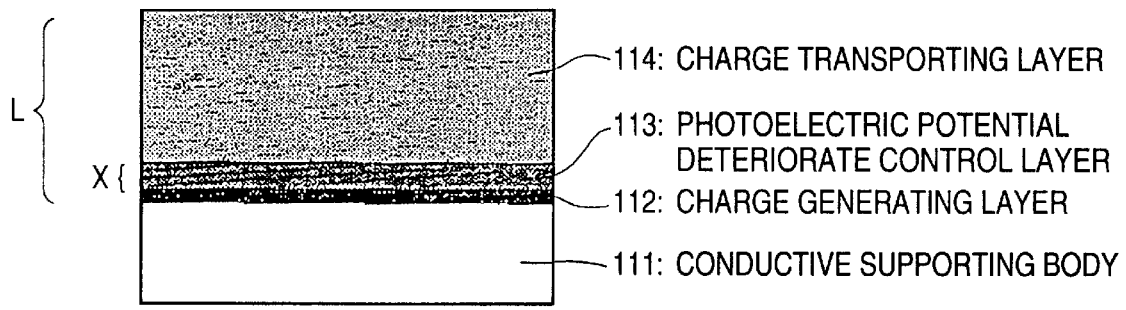
FIGS. 17(A)–(C) is sectional views to show structures of photosensitive drums.

This photosensitive body A is made up of a conductive support 111, a charge generation layer 112, a light potential attenuation control layer 113, and a charge transport layer 114, as shown in FIG. 17A. A cylindrical aluminum pipe is used as the conductive support 111.

The charge generation layer 112 is made up of a dichloro tin phthalocyanine colorant as a photoconductive colorant and a polyvinyl butyral resin. The dichloro tin phthalocyanine colorant and polyvinyl butyral resin are mixed and dispersed in a solvent at a ratio of the colorant to the resin 2:1 and applied onto an aluminum pipe, whereby a 0.2-$\mu$m charge generation layer 112 is formed.

The light potential attenuation control layer 113 consists of hexagonal selenium fine particles and a vinyl chloride-vinyl acetate copolymer resin. These are mixed and dispersed in a solvent and applied onto the charge generation layer 112, whereby a 2-$\mu$m light potential attenuation control layer 113 is formed. The voltage percentage of the hexagonal selenium fine particles in the light potential attenuation control layer is about 30%. The average particle diameter of the hexagonal selenium fine particles is 0.05 $\mu$m.

Next, an application liquid comprising a compound consisting of repetitive units shown in the following structural formula (1) having molecular weight 80000, a polymeric charge transport material, dissolved in a solvent is applied onto the light potential attenuation control layer 113 by a dip coating method and dried, whereby a charge transport layer 114 of film thickness 20 $\mu$m is formed. This photosensitive body shows the light potential attenuation characteristic shown in FIG. 15. The ratio of the film thickness of the light potential attenuation control layer, x, to the total film thickness of the photosensitive body, L, x/L, is 0.090.

Chemical 1

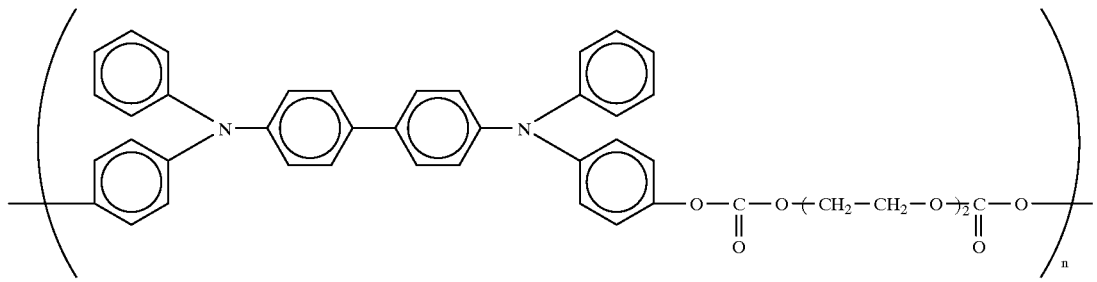

Photosensitive body B

The photosensitive body B is prepared like the photosensitive body A except that the voltage percentage of the hexagonal selenium fine particles in the light potential attenuation control layer is changed from 30% to 35% by changing the addition amount of the hexagonal selenium fine particles.

Photosensitive body C

The photosensitive body C is prepared like the photosensitive body A except that the voltage percentage of the hexagonal selenium fine particles in the light potential attenuation control layer is changed from 30% to 40% by changing the addition amount of the hexagonal selenium fine particles.

Photosensitive body D

The photosensitive body D is prepared like the photosensitive body A except that the voltage percentage of the hexagonal selenium fine particles in the light potential attenuation control layer is changed from 30% to 20% by changing the addition amount of the hexagonal selenium fine particles and except that the film thickness of the light potential attenuation control layer is changed to 1.2 μm. The ratio of the film thickness of the light potential attenuation control layer, x, to the total film thickness of the photosensitive body, L, x/L, is 0.056.

Photosensitive body E

The photosensitive body E is prepared like the photosensitive body A except that the voltage percentage of the hexagonal selenium fine particles in the light potential attenuation control layer is changed from 30% to 45% by changing the addition amount of the hexagonal selenium fine particles, except that the film thickness of the light potential attenuation control layer is changed to 5 μm, and except that the film thickness of the charge transport layer is changed to 15 μm. The ratio of the film thickness of the light potential attenuation control layer, x, to the total film thickness of the photosensitive body, L, x/L, is 0.248.

Photosensitive body F

The photosensitive body F is prepared like the photosensitive body E except that the voltage percentage of the hexagonal selenium fine particles in the light potential attenuation control layer is changed from 45% to 55% by changing the addition amount of the hexagonal selenium fine particles.

Photosensitive body G

The photosensitive body G is prepared like the photosensitive body D except that the voltage percentage of the hexagonal selenium fine particles in the light potential attenuation control layer is changed from 20% to 15% by changing the addition amount of the hexagonal selenium fine particles.

Photosensitive body H

The photosensitive body H is prepared like the photosensitive body A except that the film thickness of the film thickness of the light potential attenuation control layer is changed to 0.5 μm. The ratio of the film thickness of the light potential attenuation control layer, x, to the total film thickness of the photosensitive body, L, x/L, is 0.024.

Photosensitive body I

The photosensitive body I is prepared like the photosensitive body A except that the film thickness of the film thickness of the light potential attenuation control layer is changed to 10 μm and except that the film thickness of the charge transport layer is changed to 10 μm. The ratio of the film thickness of the light potential attenuation control layer, x, to the total film thickness of the photosensitive body, L, x/L, is 0.049.

Photosensitive body J

The photosensitive body J is prepared like the photosensitive body A except that the film thickness of the film thickness of the light potential attenuation control layer is changed to 0.2 μm. The ratio of the film thickness of the light potential attenuation control layer, x, to the total film thickness of the photosensitive body, L, x/L, is 0.009.

Photosensitive body K

The photosensitive body K is prepared like the photosensitive body A except that the film thickness of the film thickness of the light potential attenuation control layer is changed to 15 μm and except that the film thickness of the charge transport layer is changed to 5 μm. The ratio of the film thickness of the light potential attenuation control layer, x, to the total film thickness of the photosensitive body, L, x/L, is 0.74.

Photosensitive body L

Figure 17B:
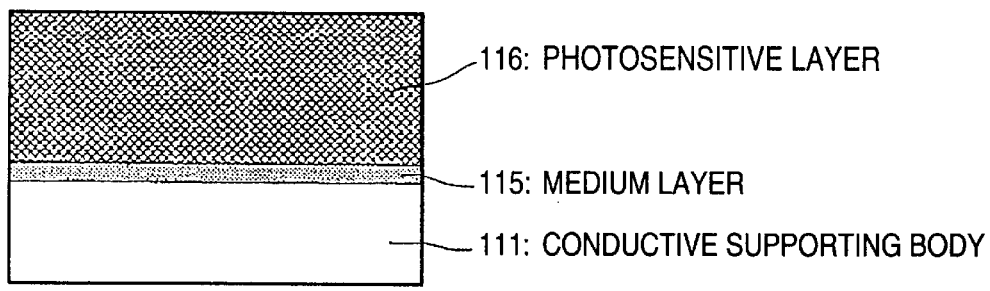
Figure 17C:
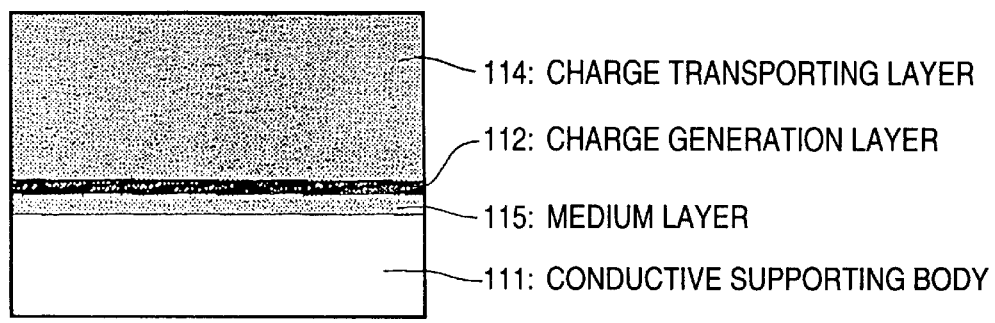

The photosensitive body L is made up of a conductive support 111, an intermediate layer 115, a charge generation layer 112, and a charge transport layer 114, as shown in FIG. 17C. A cylindrical aluminum pipe is used as the conductive support 111. A methoxy methylol nylon resin 0.2 μm thick is used for the intermediate layer 115. The charge generation layer 112 is the same as that of the photosensitive body A except that a hydroxy gallium phthalocyanine colorant is used in place of the dichloro tin phthalocyanine colorant. The charge transport layer 114 is the same as that of the photosensitive body A. The photosensitive body L shows the light potential attenuation characteristic shown in FIG. 12.

Photosensitive body M

The photosensitive body M, which is prepared based on the art disclosed in the Unexamined Japanese Patent Application Publication No. Hei. 1-169454, etc., for example, is made up of a conductive support 111, an intermediate layer 115, and a photosensitive layer 116, as shown in FIG. 17B. A cylindrical aluminum pipe is used as the conductive support 111. A methoxy methylol nylon resin 0.2 μm thick is used for the intermediate layer 115. The photosensitive layer 116, which consists mainly of phthalocyanine fine particles of a photoconductive colorant of particle diameter 0.1–1.0 μm, is mixed and dispersed with a thermosetting resin of polyester in a solvent and applied onto the intermediate layer 115 and dried. The film thickness of the photosensitive layer 116 is 25 μm. The photosensitive body M shows the light potential attenuation characteristic shown in FIG. 13.

Table 1 lists charge potential Vh, developing bias potential Vb, 100% exposure part potential VL', photosensitive body type, ratio of light energy width in responsive area E2 to light energy width in dead area E1, E2/E1, ratio of film thickness of light potential attenuation control layer x to total film thickness of photosensitive body L, x/L, light potential attenuation control layer thickness/charge transport layer thickness, and light potential attenuation control layer domain % in the examples and control examples using the photosensitive bodies.

TABLE 1

|  | Photosensitive Body | Vh (\|V\|) | Vb (\|V\|) | VL (\|V\|) | Photosensitive Body Type | E2/E1 | Control Layer x/L | Control Layer Thickness/ Transport Layer Thickness (μm) | Control Layer Domain % |
|---|---|---|---|---|---|---|---|---|---|
| Example 1 | Photosensitive Body A | 520 | 370 | 70 | S letter | 0.35 | 0.090 | 2/20 | 30 |
| Example 2 | Photosensitive Body B | 520 | 370 | 70 | S letter | 0.60 | 0.090 | 2/20 | 35 |
| Example 3 | Photosensitive Body C | 510 | 360 | 60 | S letter | 0.90 | 0.090 | 2/20 | 40 |
| Example 4 | Photosensitive Body D | 530 | 380 | 80 | S letter | 0.85 | 0.056 | 1.2/20 | 20 |
| Example 5 | Photosensitive Body E | 500 | 350 | 50 | S letter | 0.95 | 0.248 | 5/15 | 45 |
| Example 6 | Photosensitive Body H | 570 | 420 | 120 | S letter | 0.95 | 0.024 | 0.5/20 | 30 |
| Example 7 | Photosensitive Body I | 500 | 340 | 40 | S letter | 0.90 | 0.49 | 10/10 | 30 |
| Comparative Example 1 | Photosensitive Body F | 500 | 330 | 30 | S letter | 1.75 | 0.248 | 5/15 | 55 |
| Comparative Example 2 | Photosensitive Body G | 670 | 520 | 220 | S letter | 1.5 | 0.056 | 1.2/20 | 15 |
| Comparative Example 3 | Photosensitive Body J | 520 | 370 | 70 | S letter | 1.8 | 0.008 | 0.2/20 | 30 |
| Comparative Example 4 | Photosensitive Body K | 750 | 600 | 300 | S letter | 1.75 | 0.74 | 15/5 | 40 |
| Comparative Example 5 | Photosensitive Body L | 650 | 500 | 200 | J letter | 2.05 | — | — | — |
| Comparative Example 6 | Photosensitive Body M | 500 | 340 | 40 | Single layer | 0.1 | — | — | — |

Exposure conditions:
Db/Ds = 1/2 (beam diameter Db: 42 (μm))
Number of screen lines: 300

Table 2 lists the gradation characteristic evaluation results for Examples 1 to 7 and Control examples 1 to 6. Light beam output is adjusted so that a 10% pulse width input signal can be represented. The beam diameter in the main scanning direction is 42 μm and a sub full line screen of 300 lines is used.

As seen in Tables 1 and 2, if a photosensitive body which responds very steeply, such as photosensitive body M, with the ratio E2/E1 being less than 0.3 is used, it is difficult to provide a good gradation reproduction characteristic under the conditions.

TABLE 2

|  | Gradation Characteristic Evaluation Result | Reason |
|---|---|---|
| Example 1 | ○ | Linear gradation reproduction is enabled from highlight area to shadow area. |
| Example 2 | ○ | Linear gradation reproduction is enabled from highlight area to shadow area. |
| Example 3 | ○ | Linear gradation reproduction is enabled from highlight area to shadow area. |
| Example 4 | ○ | Linear gradation reproduction is enabled from highlight area to shadow area. |
| Example 5 | ○ | Linear gradation reproduction is enabled from highlight area to shadow area. |
| Example 6 | ○ | Linear gradation reproduction is enabled from highlight area to shadow area. |
| Example 7 | ○ | Linear gradation reproduction is enabled from highlight area to shadow area. |

TABLE 2-continued

|  | Gradation Characteristic Evaluation Result | Reason |
|---|---|---|
| Comparative Example 1 | ○ | Linear gradation reproduction is enabled from highlight area to shadow area. |
| Comparative Example 2 | ○ | Linear gradation reproduction is enabled from highlight area to shadow area. |
| Comparative Example 3 | ○ | Linear gradation reproduction is enabled from highlight area to shadow area. |
| Comparative Example 4 | ○ | Linear gradation reproduction is enabled from highlight area to shadow area. |

TABLE 2-continued

| | Gradation Characteristic Evaluation Result | Reason |
|---|---|---|
| Comparative Example 5 | ○ | Linear gradation reproduction is enabled from highlight area to shadow area. |
| Comparative Example 6 | X | The dynamic range of gradation reproduction is narrow and gradation of area of input signal 70% or more is saturated. |

Table 3 lists the evaluation results of granularity of a halftone image and reproducibility of 6-point characters of Gothic type corresponding to 20% pulse width input signal for Examples 1 to 7 and Control examples 1 to 6.

TABLE 3

| | Gradation Characteristic Evaluation Result | Reason |
|---|---|---|
| Example 1 | ○ | Toner is not scattered and good granularity and character reproducibility are indicated. |
| Example 2 | ○ | Toner is not scattered and good granularity and character reproducibility are indicated. |
| Example 3 | ○ | Toner is not scattered and good granularity and character reproducibility are indicated. |
| Example 4 | ○ | Toner is not scattered and good granularity and character reproducibility are indicated. |
| Example 5 | ○ | Toner is not scattered and good granularity and character reproducibility are indicated. |
| Example 6 | ○ | Toner is not scattered and good granularity and character reproducibility are indicated. |
| Example 7 | ○ | Toner is not scattered and good granularity and character reproducibility are indicated. |
| Comparative Example 1 | X | Toner scattering is noticeable and gradation image is rough. Characters are crushed noticeably. |
| Comparative Example 2 | Δ | Toner scattering in gradation image is at allowable level, but some characters are crushed. |
| Comparative Example 3 | X | Toner scattering is noticeable and gradation image is rough. Characters are crushed noticeably. |
| Comparative Example 4 | X | Toner scattering is noticeable and gradation image is rough. Characters are crushed noticeably. |
| Comparative Example 5 | X | Toner scattering is noticeable and gradation image is rough. Characters are crushed noticeably. |
| Comparative Example 6 | ○ | Toner is not scattered and good granularity and character reproducibility are indicated. |

As seen in Tables 1 and 3, for such photosensitive bodies with the ratio E2/E1 being greater than 1.3, the photosensitive body surface potential profile easily becomes analog, thus toner is easily scattered, halftone image granularity worsens, and characters are crushed noticeably. Preferably, the ratio E2/E1 is less than or equal to 1.0 from the viewpoint of granularity.

Considering the evaluation results in Tables 2 and 3 from the structural conditions of the photosensitive bodies, to set the ratio E2/E1 to a value less than or equal to 1.3, preferably the ratio of the thickness of the light potential attenuation control layer x to the thickness of the photosensitive layer L, x/L, lies in the range of 0.01 to 0.5 and the volume percentage of the charge transport domains in the light potential attenuation control layer is greater than or equal to 20% and less than or equal to 50%.

Figure 18:
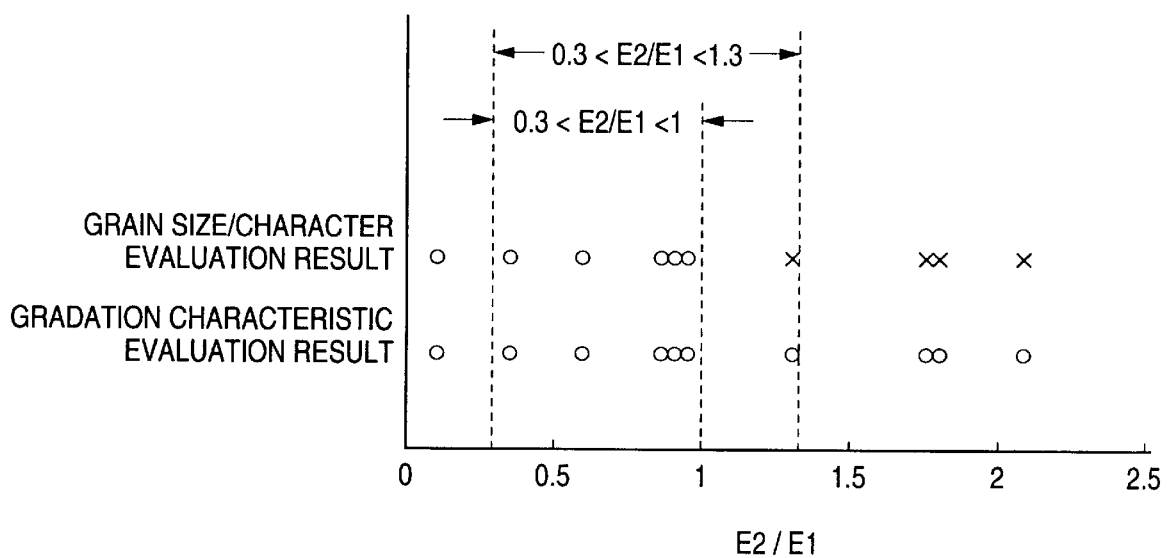
FIG. 18 is a chart to show granularity and gradation characteristic evaluation results.

FIG. 18 is a chart to show the evaluation results in Tables 2 and 3.

Both granularity/character reproducibility and gradation characteristic are held almost good in the range 0.3<E2/E1<1.3.

Table 4 lists charge potential Vh, developing bias potential Vb, 100% exposure part potential VL', photosensitive body type, and ratio E2/E1 and ratio E1/E0 at the time in the examples and control examples using the photosensitive bodies.

TABLE 4

| | Photosensitive Body | Vh (|V|) | Vb (|V|) | VL (|V|) | E2/E1 | E1/E0 |
|---|---|---|---|---|---|---|
| Example 8 | Photosensitive Body B | 500 | 340 | 40 | 0.6 | 0.25 |
| Example 9 | Photosensitive Body B | 520 | 370 | 70 | 0.6 | 0.4 |
| Example 10 | Photosensitive Body B | 550 | 400 | 100 | 0.6 | 0.55 |
| Comparative Example 7 | Photosensitive Body B | 500 | 335 | 35 | 0.6 | 0.18 |
| Comparative Example 8 | Photosensitive Body B | 580 | 430 | 130 | 0.6 | 0.65 |
| Comparative Example 9 | Photosensitive Body L | 650 | 500 | 200 | 2.05 | 0.14 |
| Comparative Example 10 | Photosensitive Body M | 500 | 340 | 40 | 0.1 | 0.5 |

Exposure conditions:
Db/Ds = ½(beam diameter Db: 42 (μm)
Number of screen lines: 300

Table 5 lists the gradation characteristic change evaluation results when charge potential Vh is changed 20 V with respect to the values listed in Table 4 under the conditions in Examples 8 to 10 and Control examples 7 to 10 listed in Table 4. The evaluation results from simulating charge characteristic change of the photosensitive bodies caused by environmental change, change with time, etc.

TABLE 5

| | Gradation Characteristic Evaluation Result | Reason |
|---|---|---|
| Example 8 | ○ | Gradation changes a little and is stable from highlight area to shadow area. |
| Example 9 | ○ | Gradation changes a little and is stable from highlight area to shadow area. |
| Example 10 | ○ | Gradation changes a little and is stable from highlight area to shadow area. |
| Comparative Example 7 | X | Density change in highlight area is large although density change in shadow area is comparatively stable. |
| Comparative Example 8 | X | Gradation changes a little and is stable from highlight area to shadow area. |
| Comparative Example 9 | X | Gradation changes a little and is stable from highlight area to shadow area. |
| Comparative Example 10 | X | Gradation changes a little and is stable from highlight area to shadow area. |

As seen in Tables 4 and 5, for photosensitive body and bias setup condition such that the ratio E1/E0 is greater than 0.6, namely, the photosensitive body surface potential is not sufficiently saturated for exposure energy at the 100% exposure time, the gradation characteristic, particularly, that in a shadow portion (high-density portion) easily changes with charge potential change of the photosensitive body. If the ratio E1/E0 is smaller than 0.2, namely, the exposure energy value at the 100% exposure time is excessively large for the light potential attenuation characteristic of the photosensitive body, the gradation characteristic, particularly, that in a highlight portion (low-density portion) easily changes with charge potential change of the photosensitive body. For photosensitive bodies with the ratio E2/E1 being smaller than 0.3, the density in an intermediate-density portion changes with charge potential change of the photosensitive body even if the ratio E1/E0 is appropriate. That is, if the ratio E1/E0 is set between 0.2 and 0.6, gradation changes a little and is stable from the highlight portion to the shadow portion (high-density portion).

Table 6 lists the gradation characteristic evaluation results under the condition of Example 1 and when the ratio between the beam diameter in the main scanning direction Dbh and the pixel pitch in the main scanning direction Dsh, Dbn/Dsh, is changed to 1/3 (Example 11) and 1 (Control example 11) from the condition of Example 1. From the table, it is seen that gradation can be represented linearly between the highlight area and the shadow area if the ratio Dbh/Dsh is at least 1/2 or less.

TABLE 6

| | Dbh/Dsh | Gradation Characteristic Evaluation Result | Reason |
|---|---|---|---|
| Example 1 | ½ | ◯ | Linear gradation reproduction is enabled from highlight area to shadow area. |
| Example 11 | ⅓ | ◯ | Linear gradation reproduction is enabled from highlight area to shadow area. |
| Comparative Example 11 | 1 | X | The dynamic range of gradation reproduction is narrow and gradation of high-density area is saturated. |

Table 7 lists the gradation characteristic evaluation results under the condition of Example 1 and when the ratio between the beam diameter in the sub scanning direction Dbv and the pixel pitch in the sub scanning direction Dsv, Dbv/Dsv, is changed to 0.7 (Example 12), 1.3 (Example 13), 0.5 (Control example 12), and 1.5 (Control example 13) from the condition of Example 1. From the table, it is seen that dynamic range is provided from the highlight portion to the shadow portion and that gradation can be represented well if the ratio Dbv/Dsv lies in the range of 0.7 to 1.3.

TABLE 7

| | Dbv/Dsv | Gradation Characteristic Evaluation Result | Reason |
|---|---|---|---|
| Example 1 | 1 | ◯ | Linear gradation reproduction is enabled from highlight area to shadow area. |
| Example 12 | 0.7 | ◯ | Gradation gamma is small in highlight area and large in shadow area, but dynamic range is provided. |
| Example 13 | 1.3 | ◯ | Gradation gamma is large in highlight area and small in shadow area, but dynamic range is provided. |
| Comparative Example 12 | 0.5 | X | The dynamic range of gradation reproduction is narrow and high-density area is not produced. |
| Comparative | 1.5 | X | The dynamic range of |

TABLE 7-continued

| | Dbv/Dsv | Gradation Characteristic Evaluation Result | Reason |
|---|---|---|---|
| Example 13 | | | gradation reproduction is narrow and gradation of high-density area is saturated. |

Number of screen lines: 300
Bias conditions for photosensitive body A and Example 1

Table 8 lists the evaluation results of gray balance in all the gradation image area and color unevenness of each gray patch image when a gradation image of a gray patch image comprising yellow, magenta, and cyan halftone images overlapped on each other is prepared under the experimental conditions of Example 2 and Control examples 5 and 6.

TABLE 8

| | Experimental Conditions (Photosensitive Body and Potential Conditions) | Gray Balance in All Gradation Image Area | Color Unevenness of Gray Patch Image |
|---|---|---|---|
| Example 14 | Same as Example 2 | High-density area to highlight area is held gray. | Because of good granularity, color unevenness in patch does not occur. |
| Comparative Example 14 | Same as Comparative Example 1 | Since reproducibility in highlight area is unstable, highlight area is colored gray. | Because of good granularity, color unevenness in patch does not occur. |
| Comparative Example 15 | Same as Comparative Example 2 | High-density area to highlight area is held gray. | Because of poor granularity, color unevenness in patch occurs. |

Thus, according to the example of the invention, the gray balance of color image can be held good and color unevenness can also be suppressed.

Example 15

Gradation characteristic and granularity are evaluated as in Example 2 except that the light beam scan section 20 shown in FIG. 6 is changed to an LED array exposure device using an array of LEDs for exposure to light. For the gradation characteristic, gradation can be represented linearly from the highlight area to the shadow area. Good results are also produced for the granularity.

Example 16

Gradation characteristic and granularity are evaluated as in Control example 1 except that the light beam scan section 20 shown in FIG. 6 is changed to an LED array exposure device using an array of LEDs for exposure to light. For the gradation characteristic, gradation can be represented linearly from the highlight area to the shadow area. However, for the granularity, toner is scattered noticeably and the image is rough.

As we have discussed, according to the image formation apparatus and the image formation method of the invention, gradation representation in a wide dynamic range providing, for example, 50-level gray scale or more can be accomplished and a halftone image excellent in granularity can be reproduced while the number of dots or the number of lines per inch is maintained, for example, 300 dpi or more so that character images can be reproduced in sufficient image quality although a practical light beam spot diameter, for example, light spot diameter of 30 μm or more is set.

What is claimed is:

1. An image formation apparatus comprising:
   a photosensitive body, on which an electrostatic latent image is formed, moving in a predetermined sub scanning direction,
   means for charging said photosensitive body,
   exposure means for irradiating a plurality of pixels arranged in a predetermined main scanning direction crossing the sub scanning direction on said charged photosensitive body simultaneously or in sequence with a light beam modulated in response to image information so as to form the electrostatic latent image on said photosensitive body, and
   developing means having a developer support for supporting the developer on a surface of the developer support, and transporting the developer to a developing position opposed to said photosensitive body for developing the electrostatic latent image formed on said photosensitive body so as to form a visible image on said photosensitive body,
   wherein said photosensitive body, said charge means, and said exposure means are adjusted so as to satisfy relations $0.3 < E2/E1 < 1.3$ and $0.2 < E1/E0 < 0.6$, where:
   VH is a charge potential of said photosensitive body charged by said charge means,
   VL is a saturated surface potential of light attenuation of said photosensitive body,
   E0 is an energy setup value of the light beam,
   E1 is a light energy of the surface potential of said photosensitive body necessary for changing from VH to VH−(VH−VL)/5, and
   E2 is a light energy of the surface potential of said photosensitive body necessary for changing from VH−(VH−VL)/5 to VL+(VH−VL)/5.

2. The image formation apparatus of claim 1, wherein said photosensitive body, said charge means, and said exposure means are adjusted so as to satisfy relation $0.3 < E2/E1 < 1.0$ in place of the relation $0.3 < E2/E1 < 1.3$.

3. The image formation apparatus of claim 1, wherein said photosensitive body comprises:
   a photosensitive layer comprising a charge generation layer that generates charges,
   a light potential attenuation control layer that stores charges injected when an injected charge amount from said photosensitive layer is relatively small, and that transports charges injected when the injected charge amount from said photosensitive layer is relatively large, and
   a charge transport layer that transports charges on a substrate.

4. The image formation apparatus of claim 3, wherein the thickness of the light potential attenuation control layer is adjusted so as to satisfy $0.01 \leq x/L \leq 0.5$, wherein:
   x is a thickness of said light potential attenuation control layer, and
   L is a thickness of said photosensitive layer.

5. The image formation apparatus of claim 3, wherein
   said light potential attenuation control layer comprises charge transport domains dispersed in an electric inactive matrix, and
   a volume percentage of the charge transport domains in said light potential attenuation control layer is adjusted to greater than or equal to 20% and less than or equal to 50%.

6. The image formation apparatus of claim 1, wherein
   said exposure means irradiates said photosensitive body with the light beam so as to satisfy relation $Dbh/Dsh \leq 1/2$ $0.7 \leq Dbv/Dsv \leq 1.3$, wherein
   Dbh is a beam diameter of the light beam in the main scanning direction,
   Dsh is a pixel pitch in the main scanning direction,
   Dbv is a beam diameter in the sub scanning direction, and
   Dsv is a pixel pitch in the sub scanning direction.

7. The image formation apparatus of claim 1, wherein
   said developing means causes the developer including magnetic particles and toner mixed to come in contact with or approach said photosensitive body at the developing position so as to deposit the toner on said photosensitive body in a pattern responsive to the electrostatic latent image formed on said photosensitive body.

8. The image formation apparatus of claim 1, wherein
   said developing means can develop in any color toner among different color toners, and develops in any one color toner for each electrostatic latent image, and
   said image formation apparatus, further comprises;
   transfer means for transferring visible images in color toners formed on said photosensitive body onto a predetermined transfer body in sequence in overlapped relation.

9. An image formation method comprising the steps of:
   charging a photosensitive body, on which an electrostatic latent image is formed, moving in a predetermined sub scanning direction,
   irradiating a plurality of pixels arranged in a predetermined main scanning direction crossing the sub scanning direction on said charged photosensitive body at the same time or in sequence with a light beam modulated in response to image information so as to form the electrostatic latent image on said photosensitive body, and
   developing the electrostatic latent image formed on said photosensitive body, thereby forming a visible image on said photosensitive body,
   wherein said charging step and said exposing step are adjusted so as to satisfy relations $0.3 < E2/E1 < 1.3$ and $0.2 < E1/E0 < 0.6$, where:
- VH is a charge potential of said photosensitive body charged in said charging step,
- VL is a saturated surface potential of light attenuation of said photosensitive body,
- E0 is an energy setup value of the light beam,
- E1 is a light energy of the surface potential of said photosensitive body necessary for changing from VH to VH−(VH−VL)/5, and
- E2 is a light energy of the surface potential of said photosensitive body necessary for changing from VH−(VH−VL)/5 to VL+(VH−VL)/5.

10. The image formation method of claim 9, wherein a photosensitive body used as said photosensitive body comprises:
- a photosensitive layer including a charge generation layer that generates charges,
- a light potential attenuation control layer that stores charges injected when an injected charge amount from said photosensitive layer is relatively small, and that transports charges injected when the injected charge amount from said photosensitive layer is relatively large, and
- a charge transport layer that transports charges on a substrate.

* * * * *